United States Patent
Nakano et al.

(10) Patent No.: US 7,865,716 B2
(45) Date of Patent: Jan. 4, 2011

(54) ENCRYPTION DEVICE, KEY DISTRIBUTION DEVICE AND KEY DISTRIBUTION SYSTEM

(75) Inventors: Toshihisa Nakano, Osaka (JP); Hideshi Ishihara, Osaka (JP); Makoto Tatebayashi, Hyogo (JP)

(73) Assignee: Panasonic Corporation, Osaka (JP)

( * ) Notice: Subject to any disclaimer, the term of this patent is extended or adjusted under 35 U.S.C. 154(b) by 1161 days.

(21) Appl. No.: 10/591,269

(22) PCT Filed: Mar. 14, 2005

(86) PCT No.: PCT/JP2005/004873
§ 371 (c)(1),
(2), (4) Date: Aug. 31, 2006

(87) PCT Pub. No.: WO2005/088891
PCT Pub. Date: Sep. 22, 2005

(65) Prior Publication Data
US 2007/0174606 A1    Jul. 26, 2007

(30) Foreign Application Priority Data
Mar. 15, 2004 (JP) .............................. 2004-073085
Mar. 15, 2004 (JP) .............................. 2004-073086

(51) Int. Cl.
*H04L 29/06* (2006.01)
*G06F 11/30* (2006.01)
*G06F 12/14* (2006.01)

(52) U.S. Cl. ........................ 713/153; 713/165; 713/166; 713/189; 713/193

(58) Field of Classification Search .................. 713/153, 713/165, 166, 189, 193
See application file for complete search history.

(56) References Cited
U.S. PATENT DOCUMENTS
6,389,535 B1 * 5/2002 Thomlinson et al. ........ 713/165
(Continued)

FOREIGN PATENT DOCUMENTS
JP   2002-281013   9/2002

OTHER PUBLICATIONS
Ayadi M M et al: "On the Formal Verification of Delegation in SESAME" Computer Assurance, 1997. Compass '97. Are We Making Progress Towards Computer Assurance? Proceedings of the 12th Annual Conference on Gaithersburg, MD, USA Jun. 16-19, 1997, New York, NY, USA, IEEE, US, Jun. 16, 1997, pp. 23-24, XP010240840.

(Continued)

*Primary Examiner*—Shin-Hon Chen
(74) *Attorney, Agent, or Firm*—Wenderoth, Lind & Ponack, L.L.P.

(57) ABSTRACT

A key distribution system distributes key data for using content to a second encryption device that has been legitimately outsourced processing by a first encryption device. The first encryption device acquires permission information indicating that the first encryption device has permission to use the content, generates certification information by making an irreversible alteration the to permission information, and transmits the permission information and the certification information to the second encryption device. The second encryption device receives the permission information and the certification information, sends them to a key distribution device, and acquires the key data from the key distribution device. The key distribution device receives the permission information and the certification information, judges whether or not the certification information was generated by the by the first encryption device, and if judging in the affirmative, transmits the key data to the second encryption device.

11 Claims, 17 Drawing Sheets

U.S. PATENT DOCUMENTS

| | | | |
|---|---|---|---|
| 7,171,567 B1 * | 1/2007 | Bayer et al. | 713/193 |
| 7,200,756 B2 * | 4/2007 | Griffin et al. | 713/189 |
| 2002/0062451 A1 * | 5/2002 | Scheidt et al. | 713/201 |
| 2002/0076204 A1 | 6/2002 | Nakano et al. | |
| 2004/0101138 A1 * | 5/2004 | Revital et al. | 380/210 |
| 2004/0187014 A1 * | 9/2004 | Molaro | 713/200 |
| 2005/0187879 A1 * | 8/2005 | Zigmond et al. | 705/59 |
| 2006/0149962 A1 * | 7/2006 | Fountain et al. | 713/151 |

OTHER PUBLICATIONS

McMahon P V: "SESAME V2 Public Key and Authorisation Extensions to Kerberos" Network and Distributed System Security, 1995., Proceedings of the Symposium on San Diego, CA, USA Feb. 16-17, 1995, Los Alamitos, CA, USA, IEEE Comput. Soc, Feb. 16, 1995, pp. 114-131, XP010134534.

Ayadi M M et al: "On the Formal Verification of Delegation in SESAME" Computer Assurance, 1997. Compass '97. Are We Making Progress Towards Computer Assurance? Proceedings of the $12^{th}$ Annual Conference on Gaithersburg, MD, USA Jun. 16-19, 1997, New York, NY, USA, IEEE, US, Jun. 16, 1997, pp. 23-34, XP010240840.

* cited by examiner

FIG.3

| LICENSE | |
|---|---|
| 121 — LICENSE ISSUE DATE (DATE) | 20031104 |
| 122 — IDENTIFIER FOR DEVICE PERMITTED TO ENCRYPT (ID1) | 0x000001 |
| 123 — SIGNATURE GENERATED BY DATA DISTRIBUTION DEVICE (SIG) | Sig(SKdd, DATE ‖ ID1) |

| INDIVIDUAL KEY CORRESPONDENCE TABLE ||
|---|---|
| ID | INDIVIDUAL KEY |
| 0x000001 | K1 |
| 0x000002 | K2 |

FIG.17

| RENEWED LICENSE | |
|---|---|
| 150 | |
| 121 — LICENSE ISSUE DATE (DATE) | 20031104 |
| 122 — IDENTIFIER FOR DEVICE PERMITTED TO ENCRYPT (ID1) | 0x000001 |
| 123 — SIGNATURE DEPENDING ON DATA DISTRIBUTION DEVICE (SIG) | Sig(SKdd, DATE ‖ ID1) |
| 124 — OUTSOURCE DESTINATION ENCRYPTION DEVICE IDENTIFIER (ID2) | 0x000002 |
| 125 — CERTIFIER GENERATED BY THE OUTSOURCE SOURCE ENCRYPTION DEVICE (MAC1) | Mac(K1, DATE ‖ ID1 ‖ SIG ‖ ID2) |
| 126 — OUTSOURCE DESTINATION ENCRYPTION DEVICE IDENTIFIER (ID3) | 0x000003 |
| 127 — CERTIFIER GENERATED BY THE OUTSOURCE SOURCE ENCRYPTION DEVICE (MAC2) | Mac(K2, DATE ‖ ID1 ‖ SIG ‖ ID2 ‖ MAC1 ‖ ID3) | ent.
ENCRYPTION DEVICE, KEY DISTRIBUTION DEVICE AND KEY DISTRIBUTION SYSTEM

BACKGROUND OF THE INVENTION

1. Field of the Invention

The present invention relates to a technology for distributing key data for using content to devices with permission to use the content.

2. Description of the Related Art

To prevent the illegitimate use of digital content data (hereafter referred to as content) various technologies have been used. These technologies permit, for example, uses such as encryption and decryption of the content in legitimate devices, and prevent such uses in illegitimate devices. One of these technologies is laid open in Patent Document 1, which describes a technology for distributing the key data, in the manner described below, such that only legitimate devices can acquire the key data for using the content.

Each device using the content holds an individual key particular to itself. The key data for using the content is encrypted using the respective individual keys held by each of the legitimate devices, and distributed. Legitimate devices decrypt what they receive using their individual keys and obtain the key data, but illegitimate devices fail to decrypt what they receive, even if they have their own keys, and cannot obtain the key data. Hence, illegitimate use of the content can be prevented.

If, however, a device permitted to use of the content outsources the encryption or decryption processing to another device, the key distribution device cannot confirm whether or not the outsource destination device (i.e., the key data destination device) has the right to use the content. This is dangerous because there is a possibility that key data will be distributed to devices that do not have the right to use of the content.

[Patent Document 1] Japanese laid open patent application 2002-281013.

[Non-patent Document 1] *"Gendai ango riron" (Modern encryption theory)*, IKENO Shinichi, KOYAMA Kenji, The Institute of Electronic, Information and Communication Engineers.

[Non-patent Document 2] *"Ango riron nyumon" (An introduction to encryption theory)* OKAMOTO Eiji, Kyoritsu Publishing Inc.

SUMMARY OF THE INVENTION

In view of this problem, an object of the present invention is to provide a key distribution device, an outsource source encryption device and a key distribution system, which distribute key data to devices judged to have been legitimately outsourced use of the content.

In order to achieve the stated object, the present invention includes an outsource source encryption device that has permission to encrypt content received from a content distribution device, and outsources encryption of the received content to an outsource destination encryption device, the outsource source encryption device including: a receiving unit operable to receive first license information proving that the outsource source encryption device has permission from the content distribution device to use the content; a generating unit operable to generate second license information that includes the received first license information and proves that encryption of the content has been outsourced to the outsource destination encryption device; and a transmission unit operable to transmit the generated second license information together with the received content to the outsource destination encryption device.

Further, the present invention includes a key distribution device that distributes key data used in encryption of content to encryption devices, the key distribution device including: an acquiring unit operable to acquire second license information that includes first license information proving that the first encryption device is permitted to use the content and proves that encryption of the content has been outsourced from a first encryption device to a second encryption device; a judging unit operable to judge whether or not the second license information was generated by the first encryption device; and a transmission unit operable to transmit the key data to the second encryption device if a result of the judgment is in the affirmative.

Further, the present invention includes a key distribution system that distributes key data for using content, the key distribution system including: an outsource source encryption device operable to receive first license information proving that the outsource source encryption device is permitted to use the content, generate second license information that includes the first license information and proves that encryption of the content has been outsourced to an outsource destination device, and transmit the generated second license information together with received content to the outsource destination encryption device; an outsource destination encryption device operable to receive the second license information together with the content, transmit the received second license information to a key distribution device and receive the key data from the key distribution device; and a key distribution device operable to receive the second license information, judge whether or not the second license information was generated by the first encryption device, and transmit the key data to the second encryption device when the judgment is in the affirmative.

With this construction, the first encryption device is verified for use of the content via the first license information, and the outsourcing of use of the content by the first encryption device to the second encryption device can be verified via the second license information. Thus, the key distribution device, which distributes keys, only distributes the key data to the second encryption device if the second encryption device is judged to have been legitimately outsourced use of the con-

BRIEF DESCRIPTION OF THE DRAWINGS

FIG. 3 shows the make up of data in a license.

FIG. 8 shows the make up of data in an individual key correspondence table 140.

FIG. 17 shows an example of the license used when an outsource destination device further outsources use of the content to another device.

DETAILED DESCRIPTION OF THE INVENTION

Below, an embodiment of the present invention is described with reference to the drawings.

1. Construction of the Key Distribution System 1

Figure 1:
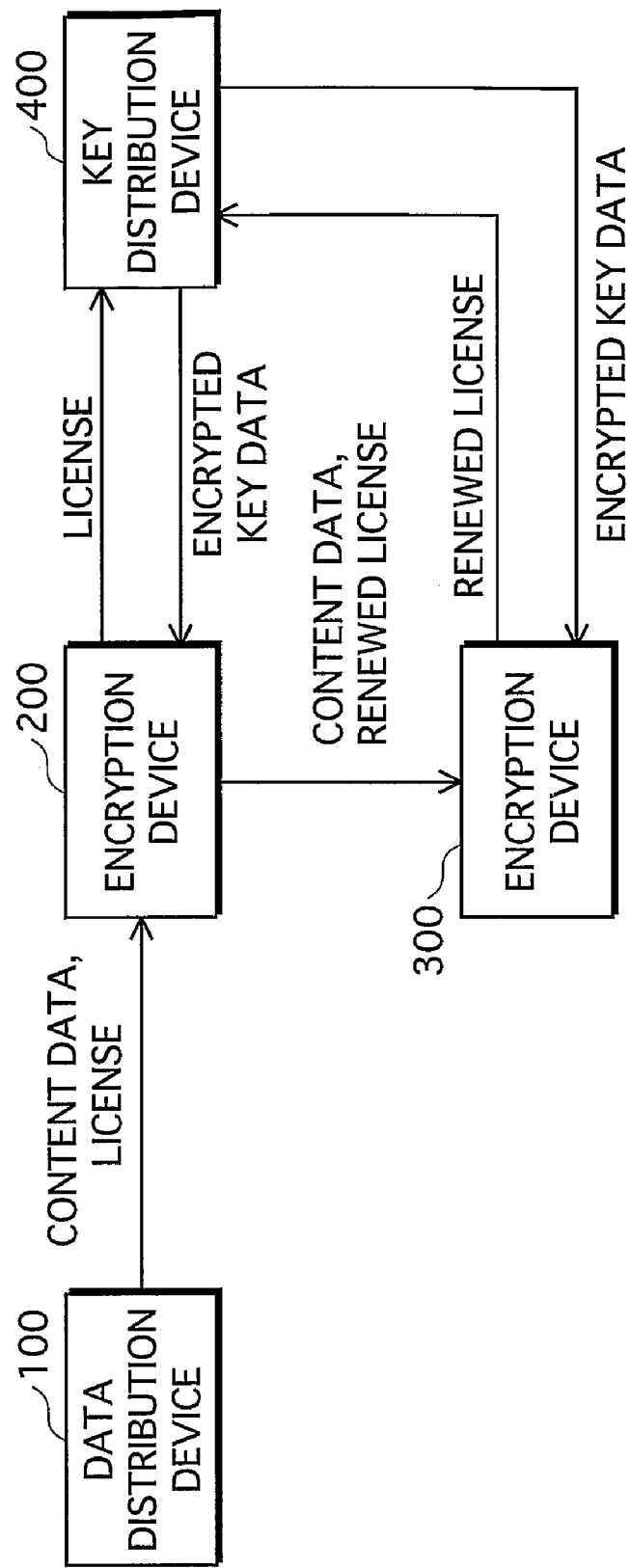
FIG. 1 is a block diagram showing the construction of a key distribution system 1.

As shown in FIG. 1, the key distribution system 1 is constructed from the data distribution device 100, the encryption device 200, the encryption device 300 and the key distribution device 400.

The encryption devices 200 and 300 encrypt the content data and record it onto a disk. The key distribution device 400 distributes the key data used to encrypt the content data. The data distribution device 100 distributes source data for the content data that is recorded onto the disk, and gives permission to record the content data onto the disk, issuing licenses to approved devices.

Here, the data distribution device 100 is maintained by a user who holds the copyright for the content data. Where the copyright holder permits the recording of the content data by another user, a license is issued to that user. For example, if the user of the encryption device 200 is permitted to record the content data, the data distribution device 100 issues a license to the encryption device 200. On receiving the license, the encryption device 200 transmits the license to the key distribution device 400, and requests the key data for encrypting the digital content. The key distribution device 400 checks the license, and where it judges that the encryption device 200 is permitted to record, transmits the key data to the encryption device 200.

The data encryption device 200 receives the key data, encrypts the content data and records the encrypted content onto a disk.

Further, where the encryption device 200 is permitted to record the content data and the encryption processing of the content data is to be outsourced to the encryption device 300, the encryption device 200 renews the license, and outsources the encryption processing to the encryption device 300 by transmitting the renewed license from the encryption device 200 to the encryption device 300.

The encryption device 300 transmits the renewed license received from the encryption device 200 to the key distribution device 400, and requests the key data. The key distribution device 400 verifies the renewed license, and where the encryption device 300 is judged to have been legitimately outsourced, transmits the key data to the encryption device 300.

Each device is described below.

1.1 Data Distribution Device 100

Figure 2:
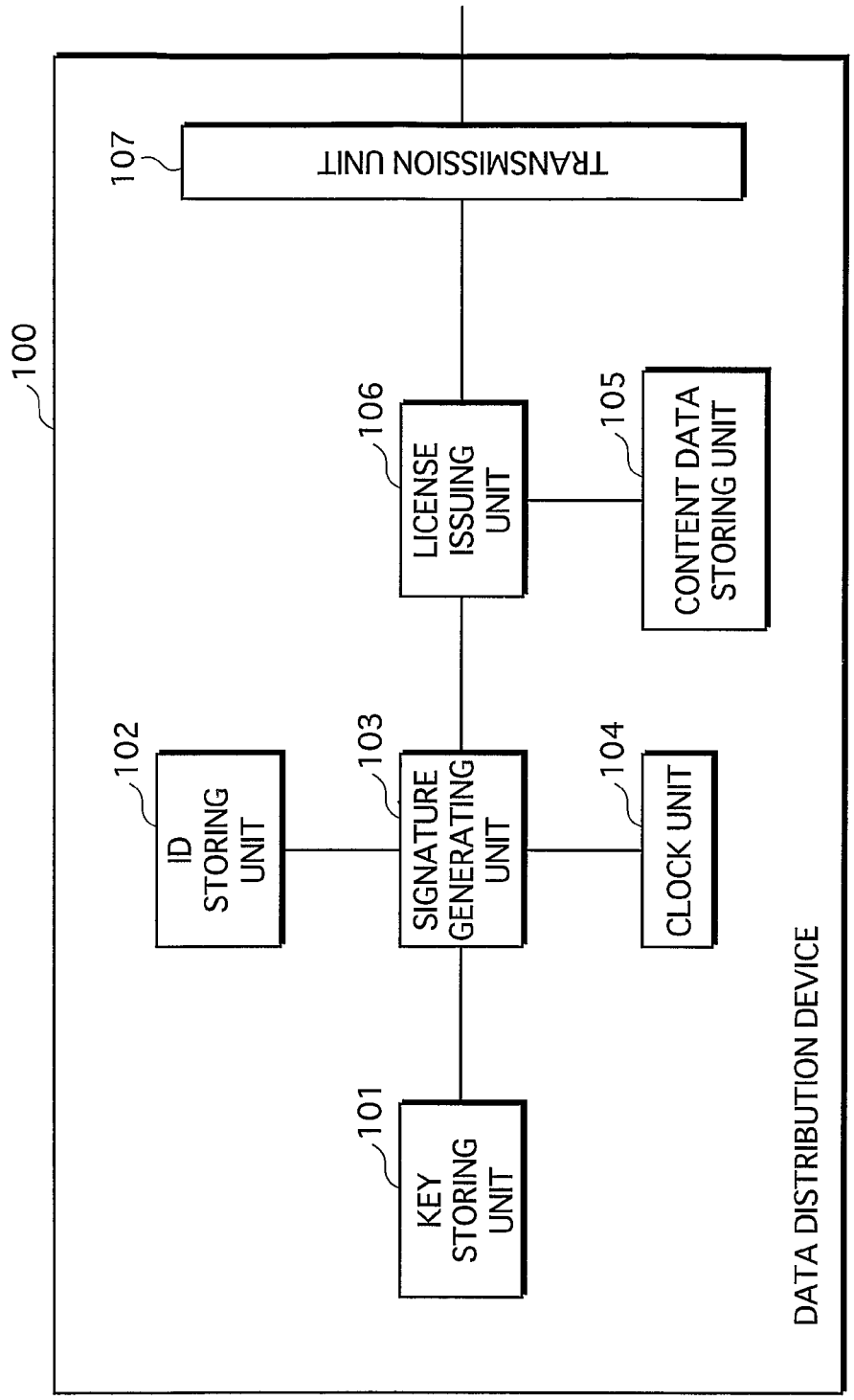
FIG. 2 is a block diagram showing the construction of a data distribution device 100.

The data distribution device 100 is a device that generates a license 120 shown in FIG. 3, and as shown in FIG. 2, is constructed from a key storing unit 101, an ID storing unit 102, a signature generating unit 103, a clock unit 104, a content data storing unit 105, a license issuing unit 106 and a transmission unit 107.

In practice, the data distribution device 100 is a computer system constructed from a microprocessor, RAM, ROM, a hard disk unit, a display unit and the like. A computer program is stored in at least one of the RAM and the hard disk unit.

The data distribution device 100 functions by having the microprocessor perform operations according to the computer program.

Each construction is described below.

(1) Key Storing Unit 101, ID Storing Unit 102 and Content Data Storing Unit 105

The content data storing unit 105 stores the content data.

The ID storing unit 102 stores the ID of encryption devices permitted to encrypt the content data and record it onto disk. Here, the ID storing unit 102 stores "0x000001" as the ID for the encryption device 200.

The key storing unit 101 stores a secret key SKdd used in the generation of a signature to be included in the license 120 of FIG. 3.

(2) Clock Unit 104

The clock unit 104 keeps the current date and time.

(3) Signature Generating Unit 103

The signature generating unit 103 generates an issue date 121 and a signature 123 to be included in the license 120 of FIG. 3. For example, in FIG. 3, the issue date 121 expresses the year, month and day using a continuous eight figure number.

When the issue date 121 is generated, the signature generating unit 103 acquires the current year, month and day data from the clock unit, and connects the acquired year, month and day data in the stated order to form the issue date 121.

Further, the signature generating unit 103 reads off the ID of encryption device 200, which is "0x000001", from the ID storing unit, and this becomes identifier 122.

When the signature 123 is generated, the signature generating unit 103 connects the issue date 121 and the identifier 122 to form connected data Ca. Here, if the issue date 121 is DATE and the identifier 122 is ID1, the connected data Ca is expressed as DATE∥ID1, where "∥" indicates that data has been connected. The signature generating unit 103 also reads off the secret key SKdd from the key storing unit 101, performs a digital signature algorithm Sig on the connected data Ca=DATE∥ID1 using the read-off secret key Skdd, and generates a digital signature SIG=Sig (SKdd, DATE∥ID1). Here "Sig (SKdd, DATE∥ID1)" indicates a generation operation of performing Sig on DATE∥ID1 using Skdd.

Note also that the target data for the signature is not limited to the connection of the issue date 121 and the identifier 122 data. Other data may be targeted provided that the selected data is dependent on the data in the license.

The signature generating unit 103 outputs the signature 123, the issue date 121, and the identifier 122 to the license issuing unit 106, where the signature 123 is SIG, the generated digital signature.

Note also that a possible choice of the digital signature algorithm, Sig, is the finite field ElGamal signature. Since the ElGamal signature is well-known, a description is omitted here.

(4) License Issuing Unit 106

The license issuing unit 106 generates the license 120 shown in FIG. 3.

The license 120 is composed of the issue date 121, the identifier 122, and the signature 123.

The issue date 121 shows the date on which the license 120 is issued.

The permitted-to-encrypt device identifier 122 is an ID for a device that is permitted to encrypt the content data stored in the content data storing unit 105.

The signature 123 is the digital signature generated by the signature generating unit 103.

The license issuing unit 106 receives the issue date 121, the identifier 122 and the digital signature 123 from the signature generating unit 103, and combines these to form the license 120.

Further, the license issuing unit 106 reads off the content data stored in the content data storing unit 105, and transmits both the license 120 and the content data, as license information indicating that encryption processing of the content data is permitted, to the encryption device 200 via the transmission unit 107

(5) Transmission Unit 107

The transmission unit 107 transmits the license information received from the license issuing unit 106 to the encryption device 200.

1.2 Encryption Device 200

Figure 4:
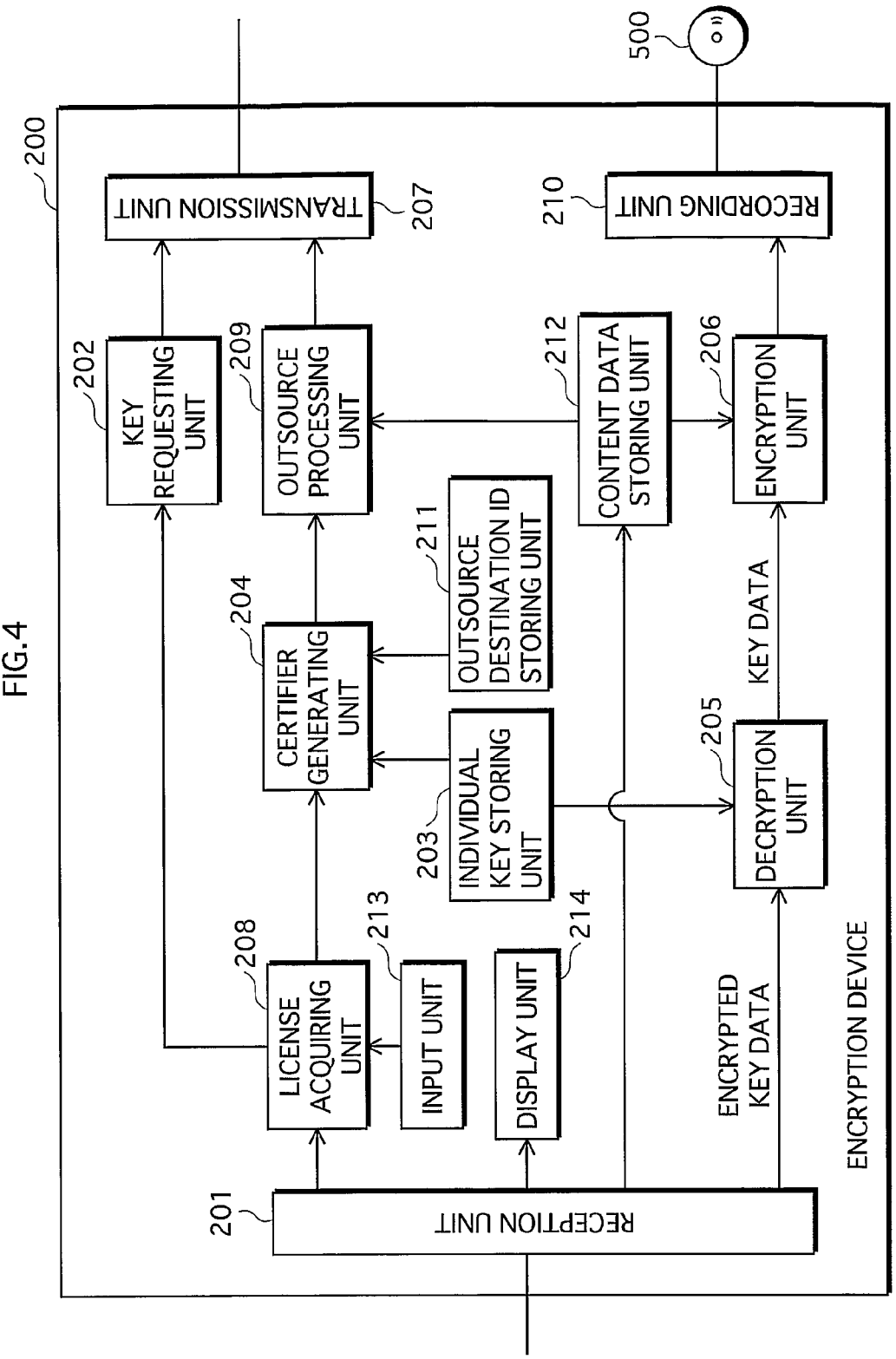
FIG. 4 is a block diagram showing the construction of an encryption device 200.

The encryption device 200 is constructed, as shown in FIG. 4, from a reception unit 201, a key requesting unit 202, an individual key storing unit 203, a certifier generating unit 204, a decryption unit 205, an encryption unit 206, a transmission unit 207, a license acquiring unit 208, an outsource processing unit 209, a recording unit 210, an outsource destination ID storing unit 211, a content data storing unit 212, an input unit 213, and a display unit 214.

The encryption device 200 is a computer system similar to that of data distribution device 100.

Each construction is described below.

(1) Reception Unit 201 and Transmission Unit 207

The reception unit 201 receives data from other devices.

On receiving the license information from the data distribution device 100, the reception unit 201 stores the content data included in the license information in the content data storing unit 212 and outputs the license 120 to the license acquiring unit 208.

Further, on receiving the encrypted key data from the key distribution device 400, the reception unit 201 outputs the encrypted key data to the decryption unit 205.

The transmission unit 207 transmits data to other devices.

On receiving key request information that includes the license 120 from the key requesting unit 202, the transmission unit 207 transmits the key request information to the key distribution device 400. Further, on receiving outsource information that includes a renewed license from the outsource processing unit 209, the transmission unit 207 transmits the outsource information to the encryption device 300.

(2) Individual Key Storing Unit 203

The individual key storing unit 203 stores an individual key K1, which is particular to the encryption device 200.

(3) Outsource Destination ID Storing Unit 211

The outsource destination ID storing unit 211 stores the ID identifying the destination encryption device to which the encryption of the content data is to be outsourced. Here, the out source destination ID storing unit 211 stores "0x000002" as the ID for the encryption device 300.

(4) Content Data Storing Unit 212

The content data storing unit 212 stores the content data received by the reception unit 201 from the data distribution device 100.

(5) License Acquiring Unit 208

The license acquiring unit 208 acquires the license 120 received by the reception unit 201 from the data distribution unit 100, and also receives instruction information, which depends on input from a user, from the input unit 213. If the instruction information indicates that the encryption processing of the content data is to be performed in the encryption device 200, the license acquiring unit 208 outputs the license 120 to the key requesting unit 202. If, on the other hand, the encryption processing is to be outsourced to another device, the license acquiring unit 208 outputs the license 120 to the verifier generating unit 204.

(6) Key Requesting Unit 202

The key requesting unit 202 receives the license 120 from the license acquiring unit 208, generates the key request information that includes the received license 120 and indicates that key data is being requested, and transmits the key request information to the key distribution device 400 via the transmission unit 207.

(7) Decryption Unit 205

The decryption unit 205 receives the encrypted key data received by the reception unit 201 from the key distribution device 400, and reads off the individual key K1 from the individual key storing unit 203. Using the read-off individual key K1, the decryption unit 205 performs a decryption algorithm D1 on the encrypted key data, and generates the plaintext key data. Here, the decryption algorithm D1 performs a process that is the inverse of the encryption algorithm E1 used by the key distribution device 400 to encrypt the key data. One example of a possible encryption algorithm E1 is DES. Since DES is well-known, a description is omitted here.

The decryption unit 205 outputs the generated key data to the encryption unit 206.

(8) Encryption Unit 206

The encryption unit 206 receives the key data from the decryption unit 205, and reads off the content data from the content data storing unit 212. Using the received key data, the encryption unit 206 performs the encryption algorithm E1 on the content data, encrypting the content data to generate encrypted content data.

The encryption unit 206 outputs the encrypted content data it has generated to the recording unit 210.

(9) Recording Unit 210

On receiving the encrypted content data from the encryption unit 206, the recording unit 210 writes the encrypted content data onto a DVD 500. Note that the recording medium is not necessarily a DVD. The encrypted data may be recorded onto any portable recording medium, possible examples being a CD or a BD (Blu-ray Disc).

(10) Certifier Generating Unit 204

Figure 5:
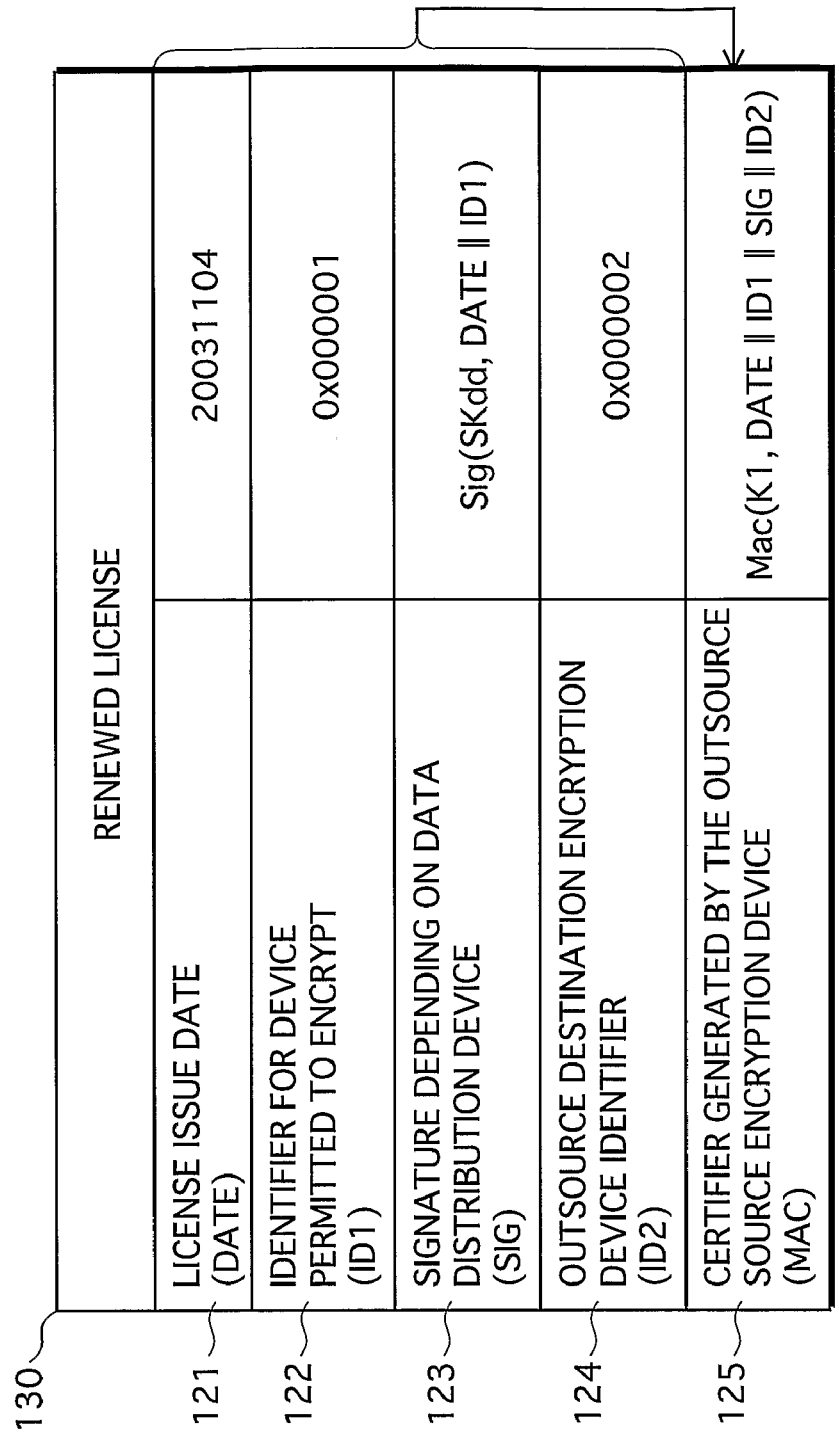
FIG. 5 shows the make up of data in a renewed license.

The certifier generating unit 204 generates the renewed license 130 of FIG. 5 by renewing the license 120 of FIG. 3. The renewed license 130 is generated by adding, to the license 120 of FIG. 3, an identifier 124 for the outsource destination encryption device and a certifier 125 that depends on the outsource source encryption device.

The identifier 124 is an ID for the destination encryption device to which the encryption processing is to be outsourced. Here, it is the ID for the encryption device 300. The certifier generating unit 204 reads off the identifier for the encryption device 300, the outsource destination, which is "0x000002", and this becomes the identifier 124.

Further, the certifier 125 is a (Message Authentication Code: MAC) certifier generated using the issue date 121, the ID 122, the signature 123, and the ID 124. The certifier generating unit 204 extracts the issue date 121, the ID 122, and the signature 123, pieces of data which are included in the license 120, and connects the pieces of extracted data and the identifier 124 to form connected data Cb.

If the issue date 121 is DATE, the identifier 122 is ID1, the signature 123 is SIG, and the identifier 124 is ID2, the connected data Cb is expressed as DATE∥ID1∥SIG∥ID2. Further, the certifier MAC is generated by reading off the individual key K1 from the individual key storing unit 203, and using the individual key K1, performing a certifier generating algorithm Mac on the connected data Cb where MAC-Mac (K1, DATED∥ID1∥SIG∥ID2). Here, Mac(K1, DATE∥ID1∥SIG∥ID2) indicates the operation of performing Mac on DATE∥ID1∥SIG∥ID2 using K1.

Note that the data targeted for certifier generation need not be limited to the connected data Cb, but may be any data dependent on the elemnents of the connected data Cb. Note also that since the certifier generation algorithm is contained in Non-patent Document 1 and Non-patent document 2 and is well known, a description is omitted here.

With the generated certifier MAC as the certifier 125, the certifier generating unit 204 generates the renewed license 130 by adding the identifier 124 and the certifier 125 to the license 120, and outputs the renewed license 130 to the outsource processing unit 209.

(11) Outsource Processing Unit 209

The outsource processing unit 209 receives the renewed license 130 from the certifier generating unit 204, and reads off the content data from the content data storing unit 212. The outsource processing unit 209 generates the outsource information, which includes the content data and the renewed license 130, and which indicates that the encryption of the content data is to be outsourced. The outsource processing unit 209 outputs the outsource information to the encryption device 300 via the transmission unit 207.

(12) Input Unit 213 and Display Unit 214

The input unit 213 receives input according to user operation, and outputs what it has received to the license acquiring unit 208 as the instruction information.

Display unit 214 displays the results based on the notification information.

1.3 Encryption Device 300

Figure 6:
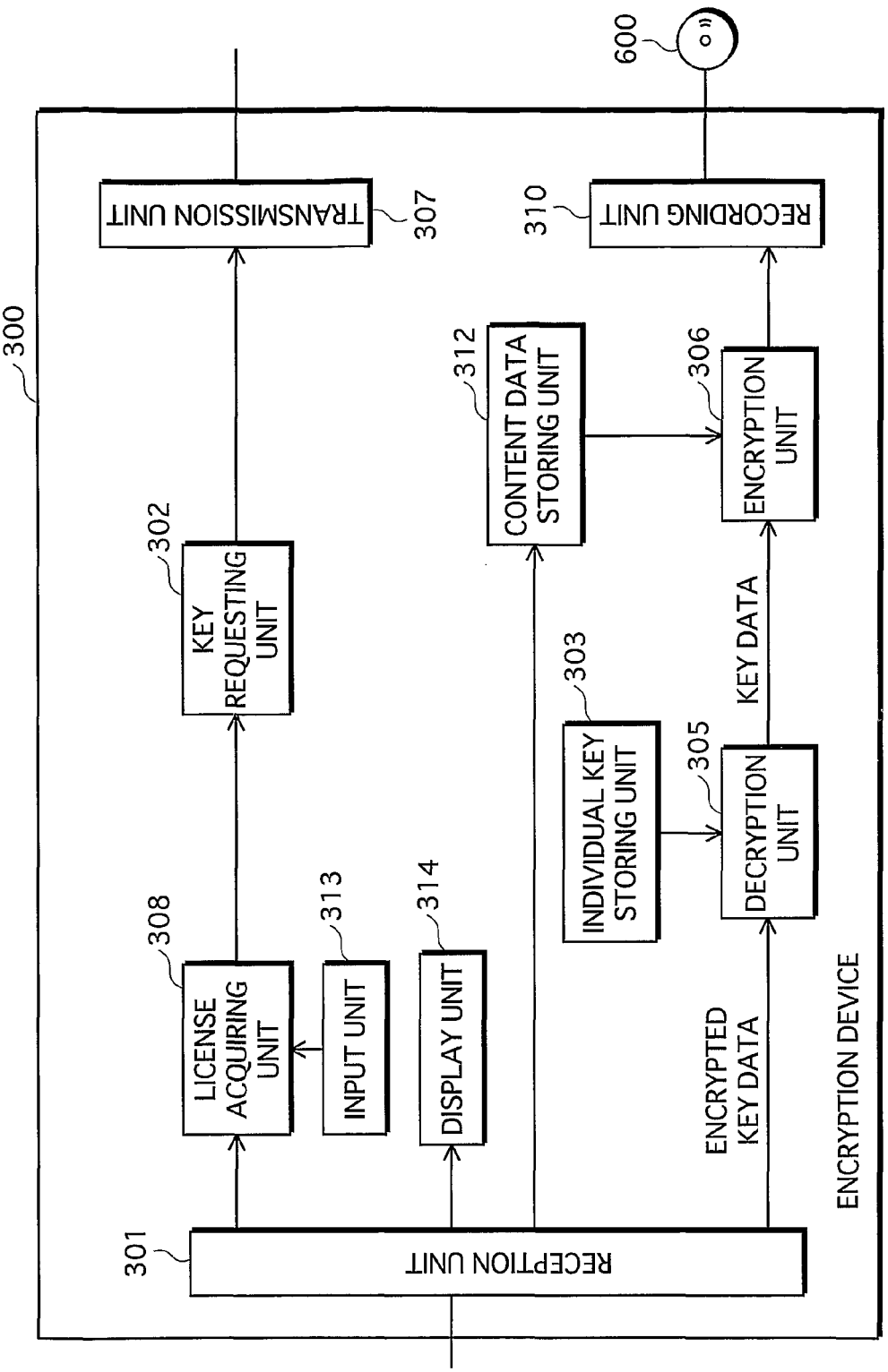
FIG. 6 is a block diagram showing the construction of an encryption device 300.

The encryption device 300 is constructed, as shown in FIG. 6, from a reception unit 301, a key requesting unit 302, an individual key storing unit 303, a decryption unit 305, an encryption unit 306, a transmission unit 307, a license acquiring unit 308, a recording unit 310, a content data storing unit 312, an input unit 313, and a display unit 314.

The encryption device 300 is a computer system similar to the encryption device 200.

(1) Reception Unit 301 and Transmission Unit 307

On receiving the outsource information from the encryption device 200, the reception unit 301 stores the content data included in the outsource information in the content data storing unit 312, and outputs the renewed license 130 to the license acquiring unit 308.

Further, on receiving the encrypted key data from the key distribution device 400, the reception unit 301 outputs the received encrypted key data to the decryption unit 305.

On receiving the key request information including the renewed license 130 from the key requesting unit 302, the transmission unit 307 transmits the received key request information to the key distribution device 400.

(2) Individual Key Storing Unit 303

The individual key storing unit 303 stores an individual key K2, which is particular to encryption device 300.

(3) Content Data Storing Unit 312

The content data storing unit 312 stores the content data included in the outsource information that is received from the encryption device 200 by the reception unit 301.

(4) License Acquiring Unit 308

The license acquiring unit 308 acquires the renewed license 130 received from the encryption device 200 by the reception unit 301, and depending on the instruction information from the input unit 313, outputs the renewed license 130 to the key requesting unit 302.

(5) Key Requesting Unit 302

On receiving the renewed license 130 from the license acquiring unit 308, the key requesting unit 302 generates the key request information, which includes the renewed license 130 and indicates that key data is requested. The key requesting unit 302 transmits the key request information to the key distribution device 400 via the transmission unit 307.

(6) Decryption Unit 305

The decryption unit 305 accepts the encrypted key data received from the key distribution device 400 by the reception unit 301, reads off the individual key K2 from the individual key storing unit 303, decrypts the encrypted key data by performing a decryption algorithm D1 on the encrypted key data using the individual key K2, and generates the key data. The decryption unit 305 outputs the generated key data to the encryption unit 306.

(7) Encryption Unit 306

The encryption unit 306 receives the key data from the decryption unit 305, reads off the content data from the content data storing unit 312, and generates encrypted content data by performing an encryption algorithm E1 on the content data using the received key data. The encryption unit 306 outputs the generated encrypted content data to the recording unit 310.

(8) Recording Unit 310

In a manner similar to the recording unit 210, on reception of the encrypted content data from the encryption unit 306, the recording unit 310 records the encrypted content data onto a DVD 600.

(9) Input unit 313 and Display Unit 314

The input unit 313 receives input dependant on the operations of the user, and outputs what it has received to the license acquiring unit 308 as instruction information.

The display unit 314 displays results based on notification information received from the reception unit 301.

1.4 Key Distribution Device 400

Figure 7:
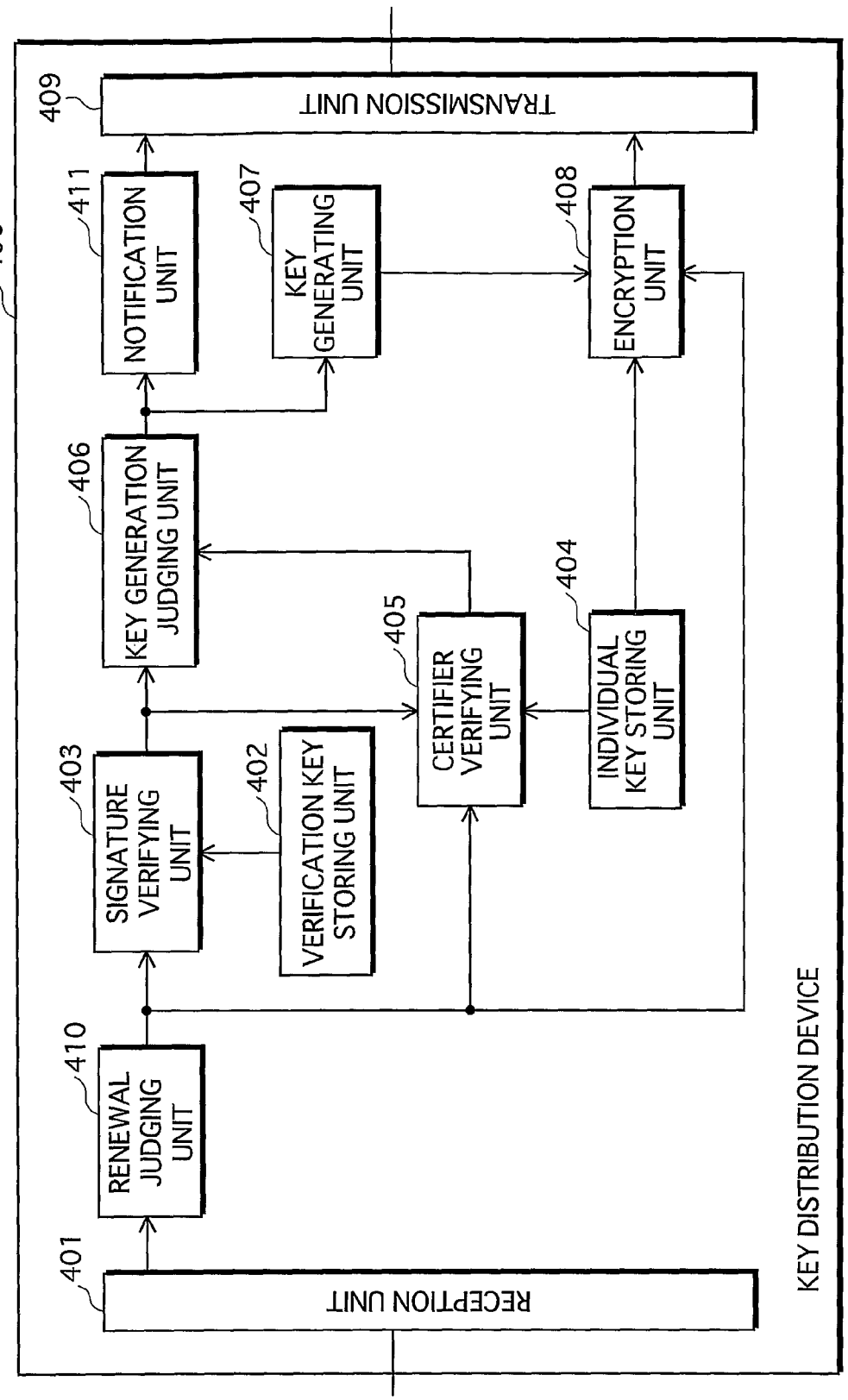
FIG. 7 is a block diagram showing the construction of a key distribution device 400.

The key distribution device 400 is constructed, as shown in FIG. 7, from a reception unit 401, a verification key storing unit 402, a signature verifying unit 403, an individual key storing unit 404, a certifier verifying unit 405, a key generation judging unit 406, a key generating unit 407, an encryption unit 408, a transmission unit 409, a renewal judging unit 410, and a notification unit 411.

The key distribution system 400 is a computer system similar to that of data distribution device 100.

(1) Reception Unit 401

The reception unit 401 receives the key request information from the encryption device 200 and the encryption device 300, and outputs the received key request information to the renewal judging unit 410.

(2) Renewal Judging Unit 410

The renewal judging unit 410 judges whether or not the license included in the key request information has been renewed, a judgment that can, for example, be made based on the data size of the received license data. If, for example, for the licenses shown in FIG. 3 and FIG. 5, the issue date 121 is 2 bytes, the permitted device identifier 122 is 2 bytes, and the signature 123 is 40 bytes, the data size of the received license is 44 bytes, and the license is judged as not renewed. If, on the other hand, the data size is more than 44 bytes, the license is judged as renewed.

Where the license is judged as not renewed, the renewal judging unit 410 outputs the license 120 to the signature verifying unit 403. Where, on the other hand, the license is judged as renewed, the renewal judging unit 410 outputs the renewed license 130 to both the signature verifying unit 403 and the certifier verifying unit 405.

(3) Verification Key Storing Unit 402 and Signature Verifying Unit 403

Verification key storing unit 402 stores a verification key PKdd, which is a public key corresponding to the secret key SKdd that is stored by the data distribution device 100.

The signature verifying unit 403 verifies the signature 123 included in the license 120 and the renewed license 130.

The signature verifying unit 403 extracts the issue date 121 and the identifier 122, which are included in both the license and the renewed license, and connects them in the stated order to form connected data Ca'. Further, the signature verifying unit 403 reads off the verification key PKdd from the verification key storing unit 402, and verifies the signature by performing a signature verification algorithm V on the signature 123 using the read-off verification key PKdd and the connected data Ca'. Here, the signature verification algorithm V is based on the ElGammal signature formula, and enables the verification of digital signature data generated using the digital signature algorithm Sig.

The digital signature verifying unit 403 outputs the verification result to the certifier verifying unit 405 and the key generation judging unit 406.

(4) Individual Key Storing Unit 404

The individual key storing unit 404 stores the individual key correspondence table 140 shown in FIG. 8.

The individual key correspondence table 140 is constructed by listing the IDs for the various encryption devices that make up system 1 in correspondence with the individual keys for the various encryption devices. Here, for the encryption devices 200 and 300, the ID of the encryption device 200, which is "0x000001", corresponds to the individual key K1, and the ID of the encryption device 300, which is "0x000002", corresponds to the individual key K2.

(5) Certifier Verifying Unit 405

The certifier verifying unit 405 receives the renewed license 130 from the renewal judging unit 410. Further, the certifier verifying unit 405 receives the verification result from the signature verifying unit 403, and where the verification result indicates a successful verification, checks whether or not the certifier 125 included in the renewed license 130 is legitimate.

On receiving the renewed license 130 from the renewal judging unit 410, the certifier verifying unit 405 extracts the issue date 121, the identifier 122, the signature 123, and the identifier 124, and connects them to form connected data Cb'. Further, referring to the individual key correspondence table 140 stored in the individual key storing unit 404, the certifier verifying unit 405 selects and reads off the individual key corresponding to the outsource destination encryption device ID, which is identifier 124. Here, the certifier verifying unit 405 reads off the individual key K2, which corresponds to the ID for encryption device 300.

Using the individual key K2, the certifier verifying unit 405 performs certifier generation algorithm Mac on the formed connected data CID' to generate a certifier MAC', compares MAC' with the certifier 125 included in the renewed license, and checks whether or not the two are identical. If the two are identical then certifier 125 is judged to be legitimate, and if they are not identical, certifier 125 is judged to be illegitimate.

Further, the certifier verifying unit 405 outputs this result as a certification result to the key generation judging unit 406.

(6) The Key Generation Judging Unit 406

In the case that the license is judged as not renewed, the key generation judging unit 406 receives the verification result from the signature verifying unit 403, and where the verification result indicates a successful verification, the key generation judging unit 406 outputs a judgment result indicating that the key data is to be generated to the key generating unit 407. Where, on the other hand, the verification result indicates a verification failure, the key generation judging unit 406 outputs the judgment result indicating that the key data cannot be generated to notification unit 411.

In the case that the license is judged as renewed, and where the verification result from the signature verifying unit 403 indicates a verification failure, the key generation judging unit 406 outputs the judgment result to the notification unit 411 in much the same way as described above. Where, on the other hand, the verification result from the signature verifying unit 403 indicates a successful verification, the key generation judging unit 406 receives the certification result from the certifier verifying unit 405, and if the certification result indicates legitimacy, outputs the judgment result indicating that key data is to be generated to the key generating unit 407. If, on the other hand, the certification result from the certifier verifying unit 405 indicates illegitimacy, the key generation judging 406 unit outputs the judgment result indicating that key data cannot be generated to the notification unit 411.

(7) Key Generating Unit 407

On receiving the judgment result indicating that key data is to be generated from the key generation judging unit 406, the key generating unit 407 generates key data to be used for encrypting the content data, and outputs the generated key data to the encryption unit 408.

(8) Notification Unit 411

On receiving the judgment result from the key generation judging unit 406, the notification unit 411 generates the notification information indicating that the key data cannot be generated, and transmits the generated notification information via the transmission unit 409 to the encryption device that was the source of the request for the key data.

(9) Encryption Unit 408

The encryption unit 408 receives the key data from the key generating unit 407, and also one of the license 120 and the renewed license 130 from the renewal judging unit 410.

If the license 120, which has not been renewed, is received, the encryption unit 408 reads off the individual key corresponding to the identifier 122 for the device permitted to encrypt from the individual key correspondence table 140, which is stored in the individual key storing unit 404. If, on the other hand, the renewed license 130 is received, the encryption unit 408 reads off the individual key corresponding to the identifier 124 for the outsource destination encryption device from the individual key correspondence table 140.

Using the read-off individual key, the encryption unit 408 performs the encryption algorithm E1 on the key data, encrypts the key data to generate the encrypted key data, and outputs the encrypted key data to the transmission unit 409.

(10) Transmission Unit 409

The transmission unit 409 receives the notification information from the notification unit 411, and transmits the received notification information to the encryption device that was the source of the request. Further, the transmission unit 409 receives the encrypted key data from the encryption unit 408, and transmits the received encrypted key data to the encryption device that was the source of the request.

2. Operation of Key Distribution System 1

The operation of the various devices that make up system 1 is described below.

2.1 Operation of Data Distribution Device 100

Figure 9:
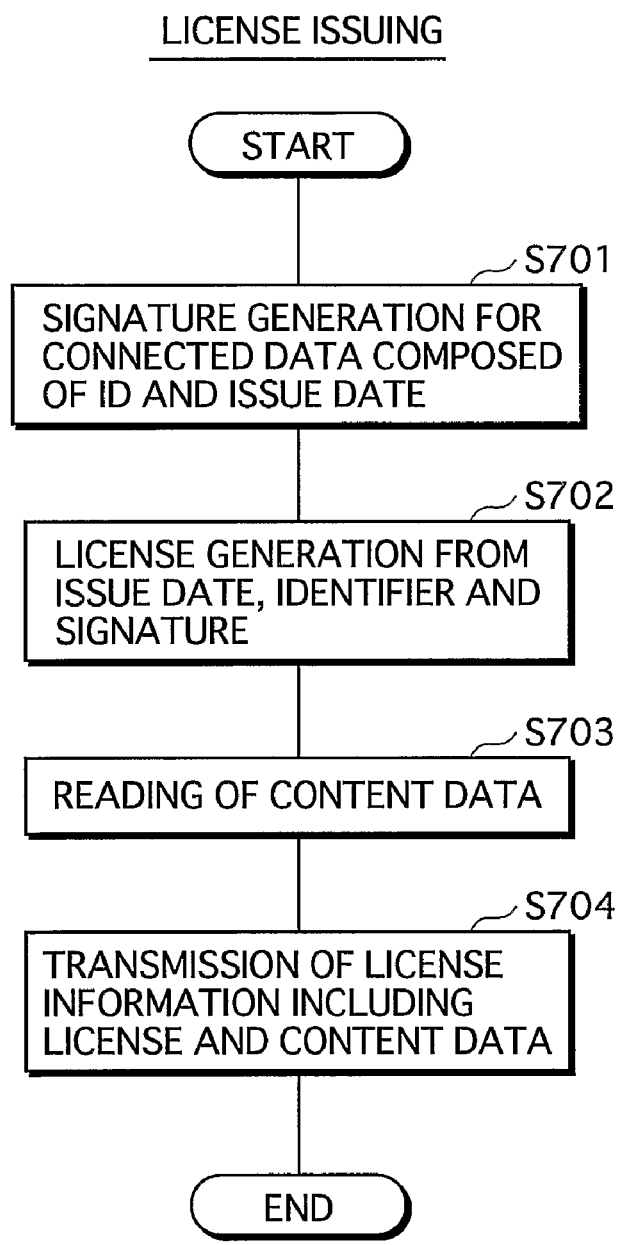
FIG. 9 is a flowchart showing operations of the data distribution device 100.

The operation of data distribution system 1 when issuing licenses is described with reference to FIG. 9.

The signature generating unit 103 acquires the current date and time from the clock unit 104 and generates issue date 121, reads off the ID of the device permitted to encrypt the content data from the ID storing unit 102 as the identifier 122, and connects these data to form the connected data Ca. Further, the signature generating unit 103 reads off the secret key SKdd from the secret key storing unit 101. Using the read-off secret key SKdd, the signature generating unit 103 generates the signature 123 for the connected data Ca (Step S701) and outputs the generated signature 123, the issue date 121 and the identifier 122 to the license issuing unit 106.

The license issuing unit 106 generates the license 120 from the issue date 121, the identifier 122 and the signature 123 (Step S702), reads off the content data from the content data storing unit 105 (Step S703). Further, the license issuing unit 106 generates the license information including the license 120 and the content data, and transmits the license information to the encryption device 200 (Step S704) via the transmission unit 107, thus completing the license issuing process.

2.2 Operation of Encryption Device 200

On receiving the license information from the data distribution device 100, the encryption device 200 performs the following processing in accordance with the user instruction information from the input unit 213. The case where the encryption device 200 performs the encryption processing and the case where the encryption device 200 outsources the encryption processing to the encryption device 300 are described below.

(1) In the Case that Encryption Processing is Performed

Figure 10:
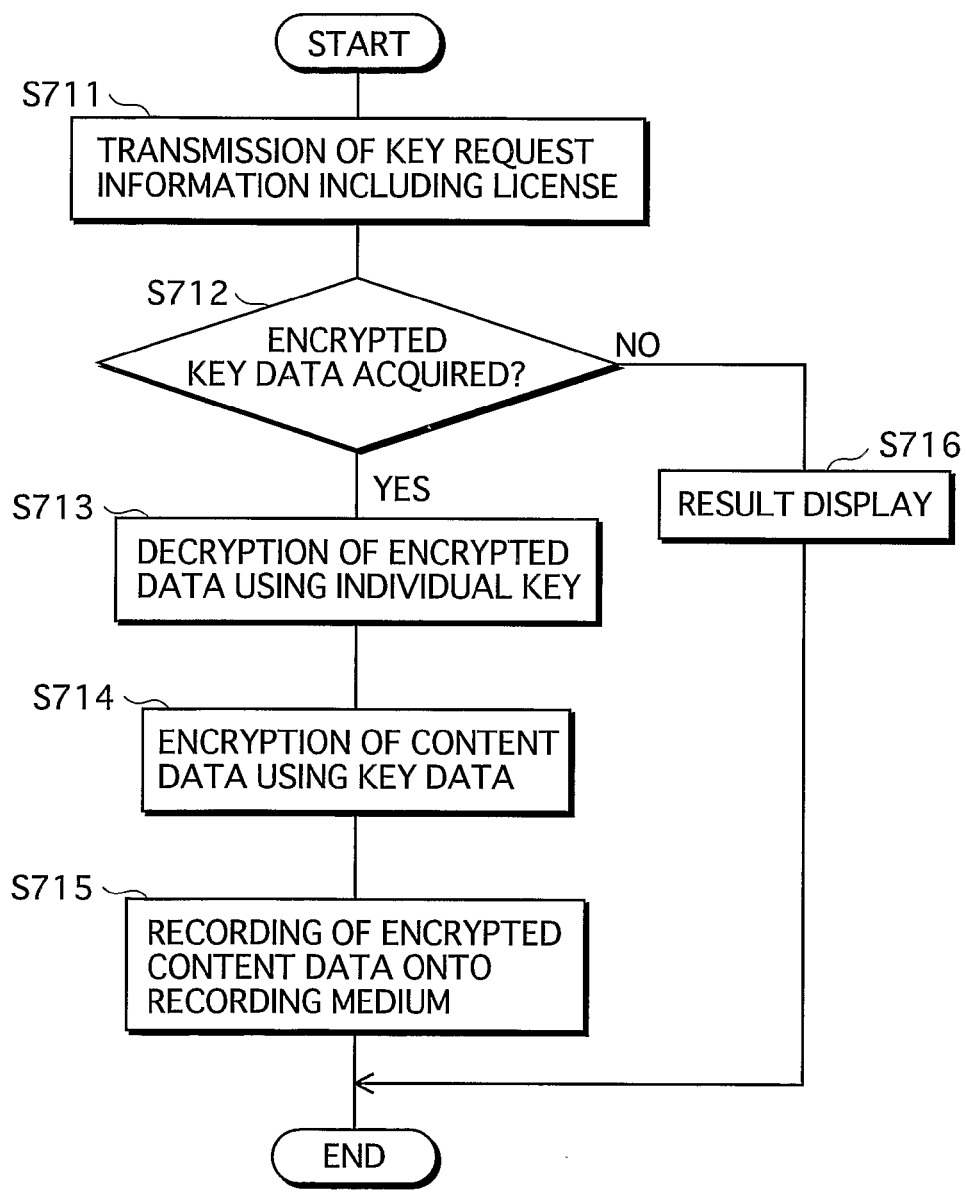
FIG. 10 is a flowchart showing operations for the encryption of the content data by the encryption device 200.

The case where the encrypt ion device 200 performs the encryption processing is described with reference to FIG. 10.

The license acquiring unit 208 receives the license 120 received by the input unit 201, outputs the license 120 to the key requesting unit 202 in accordance with the instruction information from the input unit 213, and stores the content data in the content data storing unit 212.

The key requesting unit 202 generates the key request information including the license 120, and transmits the key request information via the transmission unit 207 to the key distribution unit 400 (Step S711).

On receiving the encrypted key data from the key distribution unit 400 (YES in Step S712), the reception unit 201 outputs the encrypted key data to the decryption unit 205.

The decryption unit 205 reads off the individual key K1 from the individual key storing unit 203, decrypts the encrypted key data using the read-off key K1 to generate the key data (Step S713), and outputs the generated key data to the encryption unit 206.

The encryption unit 206 receives the key data, reads off the content data from the content data storing unit 212, and encrypts the read off content data using the key data to generate the encrypted content data (Step S714). The encrypt ion unit 206 outputs the generated encrypted content data to the recording unit 210.

The recording unit 210 records the encrypted content data onto the DVD 500 (Step S715), and in so doing completes the processing.

Note that, in step S712, where notification information is received instead of the encrypted key data from the key distribution device 400 (NO in Step S712), the display unit 214 displays a result indicating the key data cannot be acquired (Step S716). This completes the processing.

Note also that, where it is the encryption device 300 that encrypts the content data, having received the renewed license, the processing is similar to that described above.

(2) Where Encryption Processing is Outsourced

Figure 11:
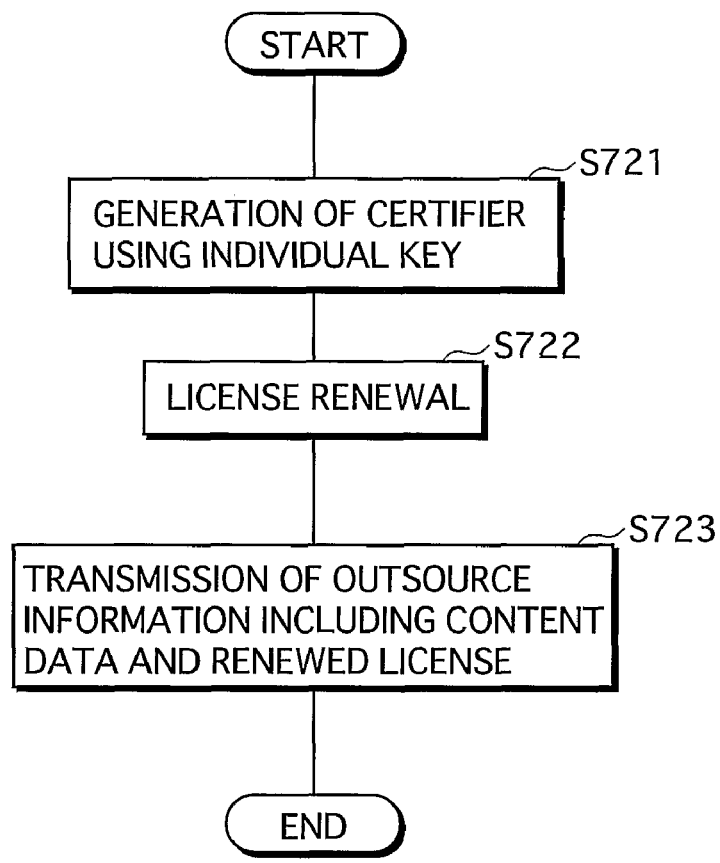
FIG. 11 is a flow chart showing operations for the outsourcing of the encryption of the content data.

The operation of the encryption device 200 in the case where the encryption device 300 is outsourced the encryption processing is described with reference to FIG. 11.

Where the instruction information from the input unit 213 indicates that the encryption processing is to be outsourced, the license acquiring unit 208 outputs the license 120 to the certifier generating unit 204.

The certifier generating unit 204 reads off the individual key K1 from the individual key storing unit 203, reads off the ID of the outsource destination encryption device 300 from the outsource destination ID storing unit 211, and extracts the issue date 121, the identifier 122, and the signature 123 from the license 120. With the outsource destination identifier ID as identifier 124, the certifier generating unit 204 forms the connected data Cb by connecting the identifier 124 and the extracted data, and using the individual key K1, generates a certifier 125 for the connected data CID (Step S721). The certifier generating unit 204 generates the renewed license 130 by adding the identifier 124 and the certifier 125 to the license 120 (Step S722), and outputs the generated renewed license to the outsource processing unit 209.

The outsource processing unit 209 receives the renewed license 130, reads off the content data from the content data storing unit 212, generates the outsource information that includes the renewed license 130 and the content data, and outputs the outsource information to the encryption device 300 (Step S723). This completes the processing.

2.3 Operation of Key Distribution Device 400

Figure 12:
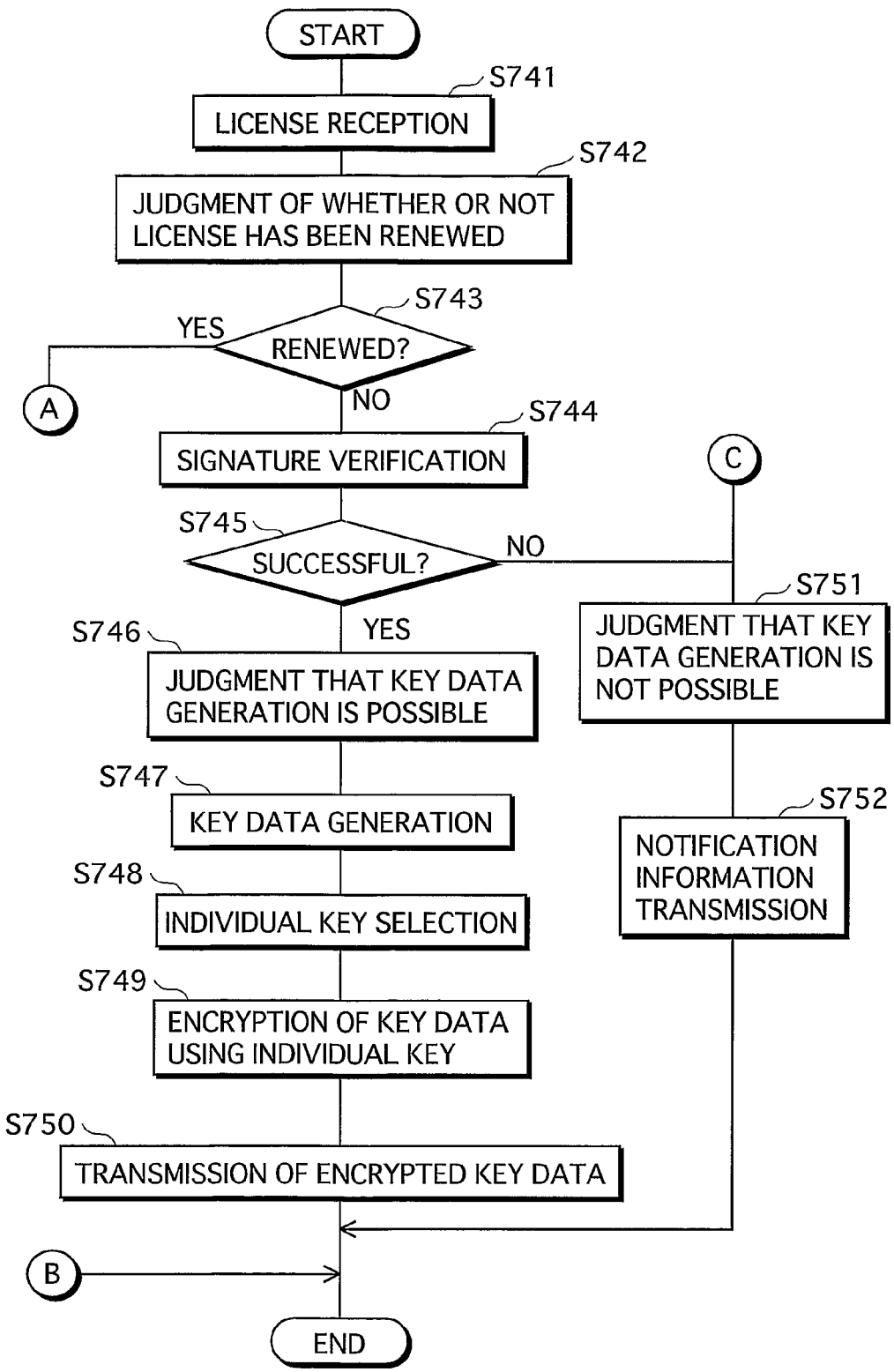
FIG. 12 is a flowchart showing operations of the key distribution device 400.
Figure 13:
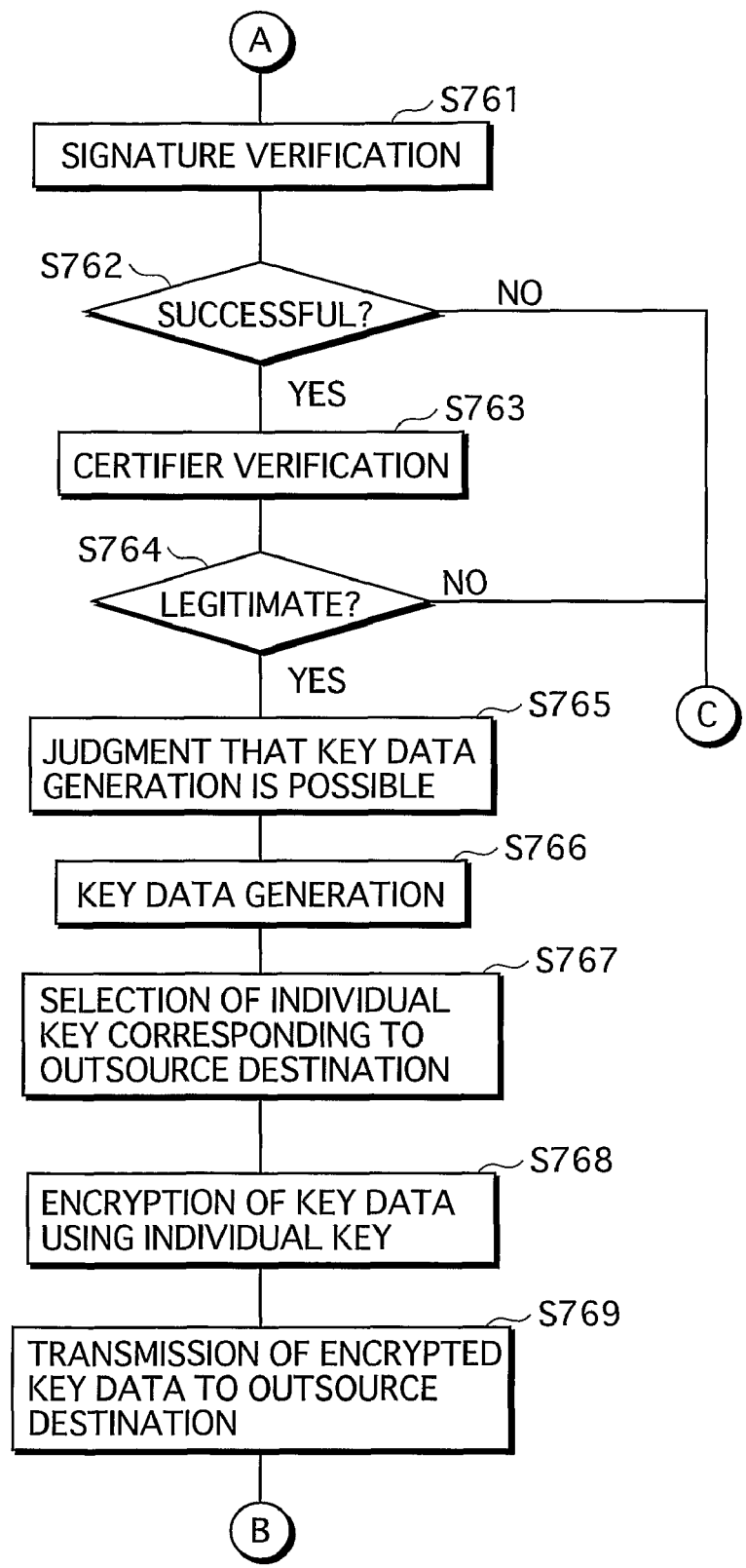
FIG. 13 is a flowchart showing operations of the key distribution device 400.

The operation of the key distribution device 400 is described with reference to FIG. 12 and FIG. 13.

On reception of a license by the reception unit 401 (Step S741), the renewal judging unit 410 judges, as described above, whether or not the license has been renewed (Step S742). Where the license has not been renewed (NO in step S743), the renewal judging unit 410 outputs the license to the signature verifying unit 403.

The signature verifying unit 403 receives the license, and reads off the verification key PKdd from the verification key storing unit 402. Further, the signature verifying unit 403 extracts the issue date 121 and the identifier 122 from the license, connects them to form connected data Ca', verifies the signature 123 using the connected data Ca' and the verification key PKdd (Step S744), and outputs the verification result to the key generation judging unit 406.

Where the received verification result indicates that verification has been successful (Step S745), the key generation judging unit 406 judges in favor of generating the key data (Step S746), and outputs the instruction information instructing the key generating unit 407 to generate the key data.

On receiving the instruction information, the key generating unit 407 generates the key data (Step S747), and outputs the generated key data to the encryption unit 408.

The encryption unit 408 receives the key data, receives the license from the renewal judging unit 410, selects the individual key corresponding to the identifier 122 in the received license from the individual key storing unit (Step S748), encrypts the key data using the selected individual key (Step S749), and outputs the generated encrypted key data to the transmission unit 409. The transmission unit 409 transmits the encrypted key data to the encryption device that was the source of the request for the key data (S750).

Where, on the other hand, the signature verification result of Step S744 indicates that verification has failed (NO in Step S745), the key generation judging unit 406 judges against generating the key data (Step S751), and outputs the instruction information instructing the notification unit 411 to provide notification of this result.

On receiving the instruction information, the notification unit 411 generates the notification information indicating that the generation of key data is not possible, and via the transmission unit 409, transmits the notification information to the encryption device that was the source of the request for the key data (Step S752).

Where, in Step S743, the license is judged to be renewed (YES in Step S743), the renewal judging unit 410 outputs the renewed license to the signature verifying unit 403 and to the certifier verifying unit 405.

In a similar way to Step S744, the signature verifying unit 403 verifies the signature (Step S761), and outputs the verification result to the key generation judging unit 406 and the certifier verifying unit 405.

Where the signature verification result indicates a successful verification (YES in Step S762), the certifier verifying unit 405 reads off the individual key corresponding to the outsource destination identifier 124 included in the renewed license from the individual key storing unit 404. Further, the certifier verifying unit 405 extracts the issue date 121, the identifier 122, the signature 123, and the identifier 124 from the renewed license, connects them to form connected data Cb', verifies the certifier 125 of the renewed license using the connected data Cb' and the individual key (Step S763), and outputs the verification result to the key generation judging unit 406. Note that where the signature verification result indicates that verification has failed (NO in Step S762), the certifier verifying unit 405 does not perform verification.

Where the certifier verification result indicates a successful verification (YES in Step S764), the key generation judging unit 406 judges in favor of generating the key data (Step S765), and outputs the instruction information instructing the key generating unit 407 to generate key data.

On receiving the instruction information, the key generating unit 407 generates the key data (Step S766), and outputs the key data to the encryption unit 408.

The encryption unit 408 acquires the renewed license, and selects the individual key corresponding to the outsource destination identifier 124 from the individual key storing unit 404 (Step S767). The encryption unit 408 encrypts the key data using the selected individual key, generates the encrypted key data (Step S768), and outputs the encrypted key data to the transmission unit 409.

The transmission unit 409 transmits the encrypted key data to the encryption device that was the source of the request for key data (Step S769). This completes the processing.

Where, the signature verification result indicates that verification has failed (NO in Step S762), and alternatively, where the signature verification result indicates a successful verification, but the certifier verification result indicates that verification has failed (NO in Step S764), the key generation judging unit 406 judges against generating the key data (Step S751), and the notification unit 411 transmits the notification information to the encryption device via the transmission unit 409 (Step S752). This completes the processing.

2.4 Operation of Key Distribution System 1 as a Whole.

Figure 14:
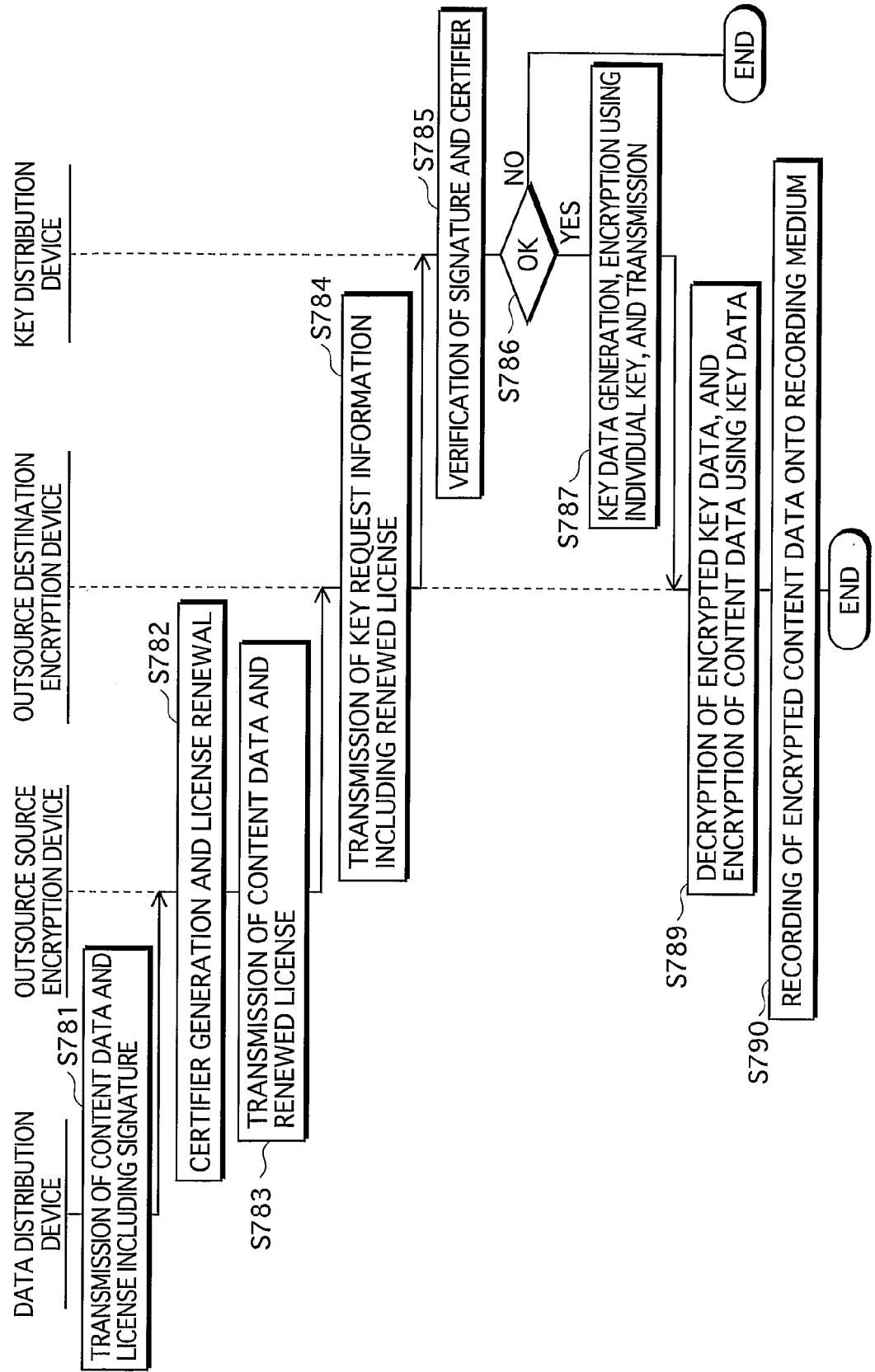
FIG. 14 is a flowchart showing the processing undertaken by the whole key distribution system 1.
Figure 15:
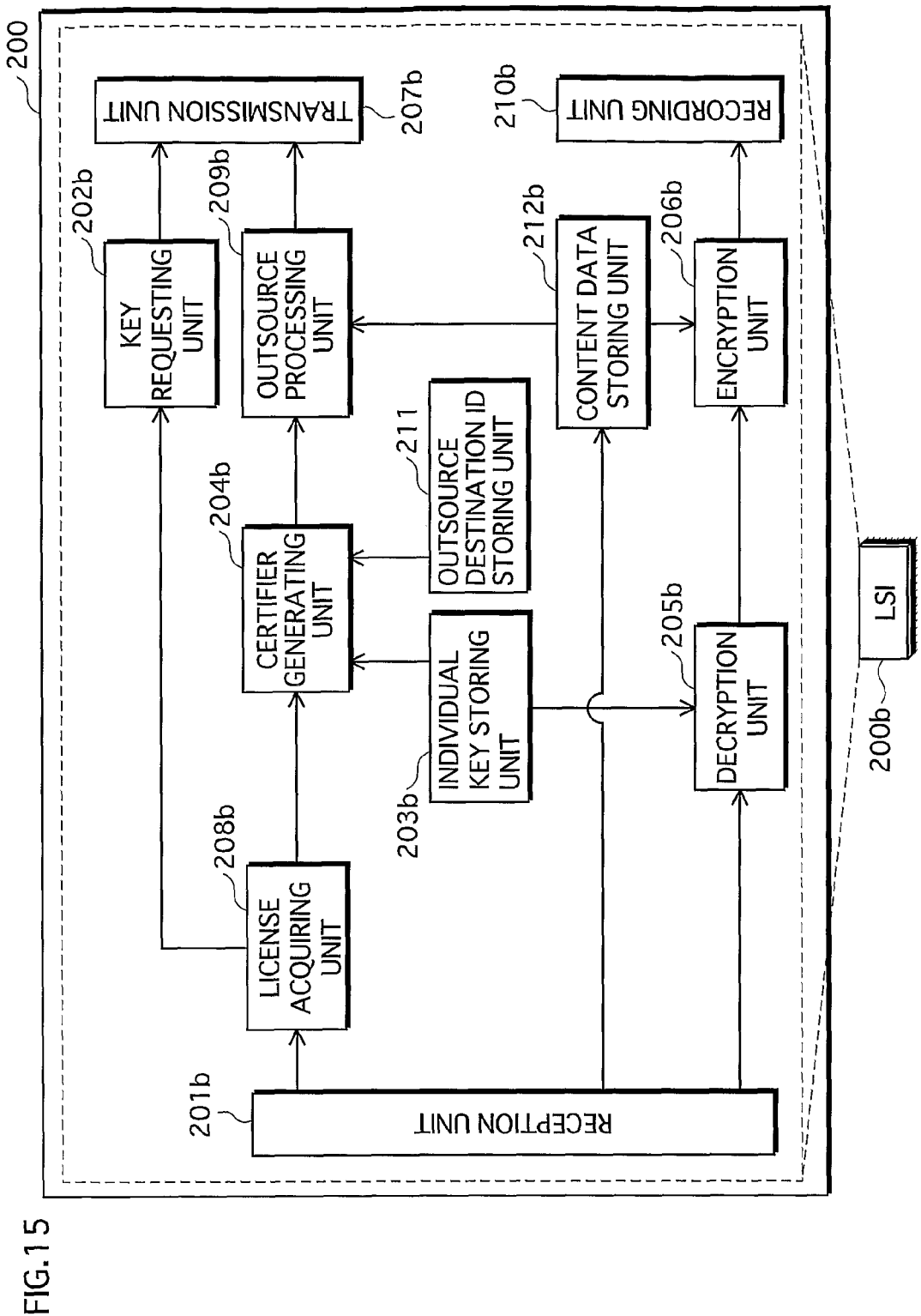
FIG. 15 shows a structure of an integrated circuit for implementing an encryption device.
Figure 16:
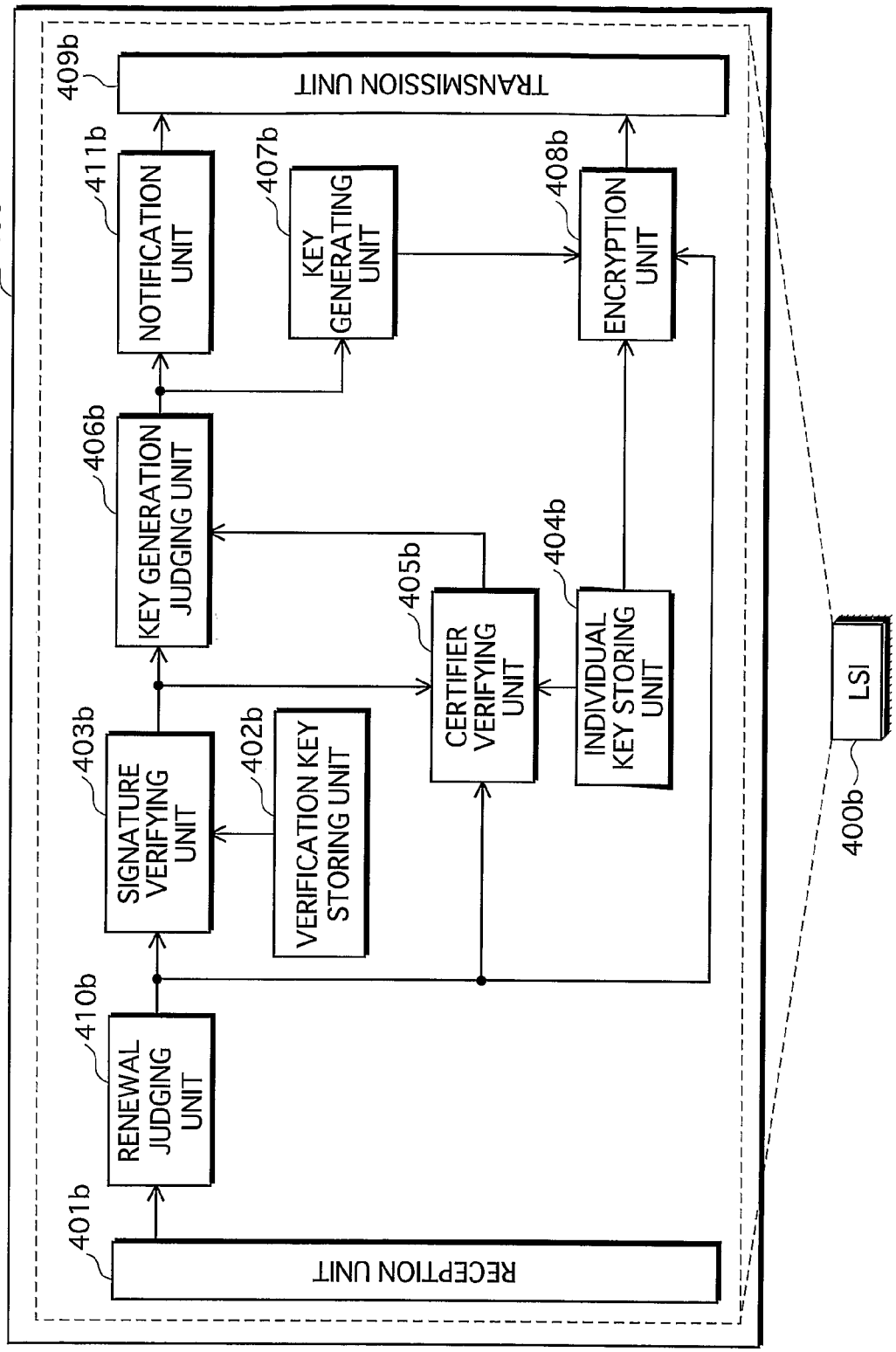
FIG. 16 shows a construction of an integrated circuit for implementing a key distribution device.

The case where the encryption device 200 outsources encryption processing to the encryption device 300 is described below with reference to FIG. 14.

The data distribution device 100 generates the license that includes the signature data, and transmits the license together with the content data to the encryption device 200 as the license information (Step S781). The encryption device 200 receives the license information, generates a certifier for the license and the outsource destination encryption device ID using the individual key K1, and renews the license (Step S782). The encryption device 200 transmits the outsource information that includes the renewed license and the content data to the encryption device 300 (Step S783).

The encryption device 300 receives the outsource information, and transmits the key request information that includes the renewed license to the key distribution device 400 (Step S784).

The key distribution device 400 receives the key request information, and verifies whether or not the signature and the certifier contained in the renewed license are legitimate (Step S785). Where either verification result indicates that verification has failed (NO in Step S786), the processing ends without the key being distributed. Where, on the other hand, the verification results indicate successful verification (YES in Step S786), the key distribution device 400 generates the key data, encrypts the key data using the individual key for encryption device 300 to generate the encrypted key data, and transmits the generated encrypted key data to encryption device 300 (Step S787).

On receiving the encrypted key data, the encryption device 300 decrypts the encrypted key data using its individual key to generate the key data. Further, the encryption device 300 encrypts the content data using the generated key data to generate encrypted content data (Step S789), and records the generated encrypted content data onto a recording medium (Step S790). This completes the processing.

3. Other Modifications

Note that though the present invention has been described based one the embodiment described above, the present invention is not, of course, limited to this embodiment. The present invention also includes the modifications of the type described below.

(1) In the above embodiment, the encryption device 200 performs the encryption processing of the content data itself, or outsources the encryption processing to the encryption unit 300. However, the encryption processing may be performed in both the encryption device 200 and the encryption device 300.

For example, where a large number of recording media are to be used to record the encrypted content data, the encryption device 200, generates a renewed license and outsources a proportion of the recording to the encryption device 300, and acquires the key data from the key distribution unit 400. Both the encryption device 200 and the encryption device 300 encrypt content data using the key data, and record the encrypted content data onto recording media, the encryption device 300 being outsourced encryption processing using the renewed license and acquiring the key data from the key distribution device in a similar manner to the encryption device 200.

If this is the case, the key distribution unit 400 does not deal with the encryption devices exclusively, distributing, for instance, the key data to one device and not the other. Instead, both when it receives the license, and when it receives the renewed license, the key distribution unit 400 performs verification, as in the above embodiment, and distributes the key data to the relevant device.

(2) In the above embodiment, the encrypted content is recorded onto DVD 600 and DVD 500 but the content data may instead be distributed to the user via a network.

(3) In the above embodiment, the encryption device 200 generates a certifier for the connected data Cb using an individual key K1. However, a digital signature instead of a certifier may be generated, and used in the renewal of the license. If this is the case, the key distribution device 400 holds a verification key to verify the signature generated by the encryption device.

(4) The data distribution device 100 may add a certifier instead of the signature to the license. If this is the case, the data distribution device 100 holds an individual key particular to the relevant device, and generates the certifier using the individual key. Further, the key distribution device 400 holds an individual key identical to the individual key held by the data distribution device, and verifies the certifier instead of the signature.

(5) In the above embodiment, the various encryption devices each hold separate individual keys. However, the present invention is not limited to such a construction. A construction may be used in which a plurality of encryption devices making up a group hold a common group key, a certifier being generated based on the group key.

If this is the case, the key distribution device holds the group key and information to identify the devices making up the group, and uses the group key instead of the individual keys of the above embodiment.

(6) The above embodiment is described with only the encryption device 200 being permitted to perform encryption processing, and with the encryption device 300 as the only outsource destination device. However, the present invention is not limited to such a construction.

For example, a plurality of devices may be permitted to perform encryption processing, and a plurality of encryption device IDs recorded in the license. Another possibility is that a plurality of encryption devices may be outsourced encryption processing, and a plurality of IDs recorded in the renewed license as outsource destination IDs.

(7) Decryption devices may be provided instead of encryption devices.

If this is the case, the encrypted content data is distributed from the data distribution device, and a decryption device with permission to decrypt transmits a license to the key distribution device in the same way as for the encryption processing. The key distribution device performs signature verification in the substantially the same way as for the embodiment, and distributes the key data for decrypting the encrypted content data. The decryption device that has acquired the key data, decrypts the encrypted content data using the key data, and generates the plain text content data, which can then be used.

Further, where the decryption of the encrypted content data is to be outsourced, the license is renewed in the same way as for the outsourcing of encryption processing, and the decryption processing out sourced in the same way as for the encryption processing.

(8) The encryption device 200 may be realized as an LSI integrated circuit having functions similar to the ones described above.

The various functions may be performed by separate chips. Alternatively, some or all of the functions may be integrated onto a single chip.

Note that though LSI is used here, the circuit may be variously described as IC, system LSI, super LSI or ultra LSI depending on the level of integration.

Note also that the technique used to make an integrated circuit for the encryption device 200 does not have to be LSI. A special-purpose circuit or general-purpose processor may be used instead. LSI circuits whose configurations can be altered after production such as the programmable FPGA (Field Programmable Gate Array) or a reconfigurable processor whose circuit cell connections and settings are configurable may also be used.

Moreover, if, due to progress in the field of semiconductor technology or the derivation of another technology, a technology to replace LSI emerges, that technology may, as a matter of course, be used to integrate the functional block. The use of biotechnology, and the like is considered to be a possibility.

(9) Note that the outsourced processing may be further out sourced from the outsource destination encryption device to another encryption device. If this is the case, much as for the encryption device 200, the encryption device 300 includes a verifier generating unit, an out source processing unit, and an outsource destination ID storing unit, and further renews the renewed license received from the encryption device 200.

As shown in FIG. 17, the verifier generating unit of encryption device 300 further adds an identifier 126 for the device of the further outsource destination and further generates a certifier 127 using an individual key. The certifier 127 is generated for the issue date 121, the identifier 122, the signature 123, the identifier 124 and the certifiers 125 and 126, much as in the encryption device 200.

The generated certifier 127 is added to generate a renewed license 150, and the renewed license 150 is transmitted together with the content data to the outsource destination encryption device.

The outsourced encryption device transmits the renewed license 150 to the key distribution device 400 as in the embodiment.

The key distribution device 400 judges whether or not the license has been renewed and if so, how many renewals have taken place. One way this can be achieved is by judging from the data size as in the embodiment. As in the embodiment, where in the renewed license, the outsource destination encryption device identifier 124 is 2 bytes long and certifier 125 is 16 bytes long, if the received license is 62 bytes, it is judged to have been renewed only once. Further, if the renewed license is 80 bytes, it possible to judge that it has been renewed twice.

Note that where multiple renewal of the license is being performed, for each renewal, the key distribution device 400 reselects the individual keys that are individually held in each of the various encryption devices, verifies the various certifiers, and encrypts the key data using the individual key that is individually held by the encryption device having the last indicated outsource destination ID.

(10) In the embodiment, the content data is transmitted between the various devices as plain text, but the content data may be encrypted before being transmitted. Note that since the encryption techniques for this transmission can be achieved using any of number of well-known techniques, a description is omitted here.

(11) When the outsource source device outsources processing to another device, the outsource source device needs to confirm the legitimacy of the other device, and hence performs apparatus authentication with the other device. Where the outsource source device judges the other device to be legitimate, it outsources the processing. Note that since the apparatus authentication can be achieved using any of a number of well-known techniques, a description is omitted here.

(12) When transmitting the key data to the encryption device, the key distribution device 400 encrypts the key data using the individual key of the transmission destination, and transmits the encrypted key data. However the present invention is not limited to this method. For example, instead of the individual key, a public key corresponding to a secret key held by the transmission destination encryption device may be used. Alternatively, apparatus authentication and common key processing may be carried out between the key distribution device 400 and the transmission destination encryption device, a session key only valid for the duration of a session supplied to the transmission destination encryption device, and the key data encrypted using the session key.

(13) The present invention may be the methods indicated above. Further, these methods may be a computer program executed by a computer and further be the digital code of the computer program.

Further, the present invention may be the above-mentioned computer program and the digital code recorded onto a recording medium that can be read by a computer. Examples of such recording media include, flexible disk, hard disk, CD-ROM, MO, DVD-ROM, DVD-RAM, BD (Blu-ray Disc), semiconductor memory and the like.

Further, the present invention may be realized such that the computer program and the digital code are transmitted across telecommunications networks, wired and wireless, such as the Internet and the like.

Further, the present invention may be a computer system having a microprocessor and a memory, the memory holding the above-mentioned computer program and the microprocessor performing operations according to the computer program.

Further, the computer program and the digital code may be installed on an independent computer system by either recording the digital code one of the recordingmedium and transferring the recording medium, or transferring the computer program and digital code via one of the networks.

(14) The present invention may include various combinations of the embodiment and the modifications.

4. Summary

As described above, the present invention includes an out source source encryption device that has permission to encrypt content received from a content distribution device and out sources encryption of the received content to an outsource destination encryption device, the outsource source encryption device including: a receiving unit operable to receive first license information proving that the outsource source encryption device has permission from the content distribution device to use the content; a generating unit operable to generate second license information that includes the received first license information and proves that encryption of the content has been outsourced to the outsource destination encryption device; and a transmission unit operable to transmit the generated second license information together with the received content to the outsource destination encryption device.

The present invention further includes a key distribution device that distributes key data used in encryption of content to encryption devices, the key distribution device including: an acquiring unit operable to acquire second license information that includes first license information proving that the first encryption device is permitted to use the content and proves that encryption of the content has been outsourced from a first encryption device to a second encryption device; a judging unit operable to judge whether or not the second license information was generated by the first encryption device; and a transmission unit operable to transmit the key data to the second encryption device if a result of the judgment is in the affirmative.

The present invention further includes a key distribution system that distributes key data for using content, the key distribution system including: an outsource source encryption device operable to receive first license information proving that the outsource source encryption device is permitted to use the content, generate second license information that includes the first license information and proves that encryption of the content has been outsourced to an outsource destination device, and transmit the generated second license information together with received content to the outsource destination encryption device; an outsource destination encryption device operable to receive the second license information together with the content, transmit the received second license information to a key distribution device and receive the key data from the key distribution device; and a key distribution device operable to receive the second license information, judge whether or not the second license information was generated by the first encryption device, and transmit the key data to the second encryption device when the judgment is in the affirmative.

With this construction, the first encryption device is verified for use of the content via the first license information, and the outsourcing of use of the content from first encryption device to the second encryption device can be verified via the second license information. Hence, the key distribution device, which distributes keys, can judge whether or not the second encryption device has been legitimately outsourced use of the content, and distribute the key data accordingly.

Here, the generating unit may use individual information particular to the outsource source encryption device to generate certification information based on the first license information, and the second license information may further include the certification information.

Further, the second license information may include certification information generated for the first license information using individual information particular to the first encryption device, and the judging unit may hold verification information corresponding to the individual information, and judge using the verification information.

With this construction, the key distribution device is able to judge whether or not the first encryption device generated the second license information by verifying the certification information, because individual information particular to the outsource source device is used.

Here, the generating unit may generate the certification information based on identification information of the outsource destination encryption device and the first license information.

Further, the certification information may be generated from the first license information and the identity information of the second encryption device.

With this construction, it can be verified that the first encryption device, the outsource source, has outsourced content processing to the second encryption device because the certification information is generated using identity information identifying the outsource destination as the second encryption device.

Here, the certification information may be a certifier generated using secret key encryption, and the individual information may be a secret key used in the secret key encryption.

Further, the certification information may be a certifier generated using secret key encryption, the individual information may be a secret key used in the secret key encryption, the judging unit may generate the certifier by performing an algorithm in substantially the same way as the secret key encryption is performed on the first license information, and judge whether or not the generated certifier and a received certifier match, and when the generated and received certifiers match, judge that the second license information was generated by the first encryption device.

Further, the certification information may be digital signature data generated using public key encryption, the individual information may be a secret key used in the public key encryption, the verification information may be a public key corresponding to the secret key, and the judging unit may perform verification on the digital signature data using the public key, and if a verification result indicates successful verification, judge that the second piece of license information was generated by the by the first encryption device.

With this construction, it can be ascertained whether or not the first encryption device has generated the certifier information using the certifier or the digital signature. Hence it can be judged whether or not the first encryption device has outsourced the content processing.

Here, the first license information may include certification information generated using individual information particular to the content distribution device.

With this construction, it can be verified whether or not permission to use the content has been given by the content distribution device.

Here, the certification information may be generated based on identity information of the outsource source encryption device.

With this construction it can be verified, from the identity information of the source encryption device, whether or not the content distribution device has permitted the outsource source encryption device to make use of the content.

Here, the certification information may be a certifier generated using secret key encryption, and the individual information may be a secret key used in the secret key encryption.

Further, the certification information may be digital signature data generated using public key encryption, and the individual information may be a secret key of the public key encryption.

With this construction, it can be verified whether or not the content distribution device has generated the license information, and ascertained whether or not the content distribution device has permitted the use of the content.

Here, the receiving unit may further receive fourth license information that includes third license information proving that another encryption device has permission to use the content from a content distribution device and proves that the other encryption device has outsourced the encryption of the content to the outsource source encryption device, the generating unit may generate fifth license information that includes the fourth license information and proves that encryption has been outsourced to the outsource destination encryption device, and the transmission unit may transmit the fifth license information together with the content to the outsource destination encryption device.

Here, the acquiring unit may further acquire third license information that includes the second license information and proves that the encryption of the content has been outsourced from the second encryption device to a third encryption device, the judging unit may further judge whether or not the third license information was generated by the second encryption device, and the transmission unit may further transmit the key data to the third encryption device if the judgment result is in the affirmative.

With this construction, even when an outsourced encryption device further outsources use of the content to another encryption device, providing that the key distribution device can confirm that the outsourcing is legitimate, the key distribution device can distribute the key data. Hence, the various encryption devices can flexibly outsource use of the content as conditions require.

With this construction, the key distribution device is flexible enough to carry out outsourcing, even if processing has been out sourced to another encryption device by the encryption device to which processing was initially outsourced. This is because the key distribution device can distribute key data provided that it can ascertain that the processing has been legitimately outsourced.

Here, the key distribution device, may further include an acquired information judging unit that judges which of the first license information and the second license information the acquiring unit has received, wherein, the judging unit, when the judgment result from the acquired information judging unit indicates that the first piece of license information has been received, judges whether or not the first license information was generated by the content distribution device which distributes the content, and when the judgment result indicates that the second piece of license information has been received, judges whether or not the second license information was generated by the first encryption device, and the transmission unit, when the judgment result from the acquired information judging unit indicates that the first license information has been received, transmits the key data to the first encryption device, and when the judgment result indicates that the second license information has been received, transmits the key data to the second encryption device.

Further, the acquired information judging unit may judge that the first license information was received if the data size of the acquired information is less than or equal to a predetermined value, and judge that the second license information was received if the data size is greater than the predetermined value.

With this construction, as well as distributing the key data when encryption is judged to have been outsourced, the key data can also be distributed when encryption of the content has not been outsourced, provided that the encryption device in question has permission to use the content. This makes the system more flexible.

Here, the key distribution device may further include: a key holding unit operable to hold an individual key also held by the second encryption device, the individual key being particular to the second encryption device; and an encryption unit operable to encrypt the key data using the individual key to generate encrypted key data, wherein the transmission unit transmits the encrypted key data to the second encryption device as the key data.

With this construction, the key data is encrypted using an individual key, so even if the encrypted key data is acquired by another device, it cannot be decrypted. Hence use of the content by illegitimate devices can be prevented.

INDUSTRIAL APPLICABILITY

The present invention can be used administratively and also repeatedly and continuously in the software industry in which software such as computer programs and digitized content, including copyright material such as movies and music, are being provided. Further, the relay devices, key distribution devices and integrated circuits can be produced and marketed by manufacturers of electronics and the like.

The invention claimed is:

1. An integrated circuit used in an outsource source encryption device that has permission to encrypt content received from a content distribution device, and outsources encryption of the received content to an outsource destination encryption device, the integrated circuit comprising:
   a receiving unit operable to receive first license information proving that the outsource source encryption device has permission from the content distribution device to use the content;

a generating unit operable to (i) generate certification information based on the first license information using identification information of the outsource source encryption device, and (ii) generate second license information that proves that encryption of the content has been outsourced to the outsource destination device, the second license information including the first license information and the certification information; and a transmission unit operable to transmit the generated second license information together with the received content to the outsource destination encryption device.

2. An outsourcing method used in an outsource source encryption device that has permission to encrypt content received from a content distribution device, and outsources encryption of the received content to an outsource destination encryption device, the outsourcing method comprising steps of:

a receiving step of a receiving unit receiving first license information proving that the outsource source encryption device has permission from the content distribution device to use the content;

a generating step of a generating unit (i) generating certification information based on the first license information using identification information of the outsource source encryption device, and (ii) generating second license information that proves that encryption of the content has been outsourced to the outsource destination encryption device, the second license information including the first license information and the certification information; and a transmission step of a transmission unit transmitting the generated second license information together with the received content to the outsource destination device.

3. A non-transitory computer readable recording medium on which is recorded an outsourcing program used in an outsource source encryption device that has permission to encrypt content received from a content distribution device, and outsources encryption of the received content to an outsource destination encryption device, wherein when executed the outsourcing program causes a computer to perform a method comprising:

a receiving step of a receiving unit receiving first license information proving that the outsource source encryption device has permission from the content distribution device to use the content;

a generating step of a generating unit generating (i) certification information based on the first license information using identification information of the outsource source encryption device, and (ii) second license information that proves that encryption of the content has been outsourced to the outsource destination encryption device, the second license information including the first license information and the certification information; and a transmission step of a transmission unit transmitting the generated second license information together with the received content to the outsource destination device.

4. An outsource encryption device that has permission to encrypt content received from a content distribution device, and outsources encryption of the received content to an outsource destination encryption device, the outsource source encryption device comprising:

a receiving unit operable to receive first license information proving that the outsource source encryption device has permission from the content distribution device to use the content;

a generating unit operable to (i) generate certification information based on the first license information using identification information of the outsource source encryption device, and (ii) generate second license information that proves that encryption of the content has been outsourced to the outsource destination encryption device, the second license information including the first license information and the certification information; and a transmission unit operable to transmit the generated second license information together with the received content to the outsource destination encryption device.

5. The outsource source encryption device of claim 4, wherein the receiving unit further receives fourth license information that includes third license information proving that another encryption device has permission to use the content from a content distribution device and proves that the other encryption device has outsourced the encryption of the content to the outsource source encryption device, the generating unit generates fifth license information that includes the fourth license information and proves that encryption has been outsourced to the outsource destination encryption device, and the transmission unit transmits the fifth license information together with the content to the outsource destination encryption device.

6. An outsource encryption device that has permission to encrypt content received from a content distribution device, and outsources encryption of the received content to an outsource destination encryption device, the outsource source encryption device comprising:

a receiving unit operable to receive first license information proving that the outsource source encryption device has permission from the content distribution device to use the content;

a generating unit operable to (i) generate certification information based on the first license information using a secret key used in secret key encryption in the outsource source encryption device, the certification information being a certifier generated using the secret key information, and (ii) generate second license information that proves that encryption of the content has been outsourced to the outsource destination encryption device, the second license information including the first license information and the certification information; and a transmission unit operable to transmit the generated second license information together with the received content to the outsource destination encryption device.

7. An outsource encryption device that has permission to encrypt content received from a content distribution device, and outsources encryption of the received content to an outsource destination encryption device, the outsource source encryption device comprising:

a receiving unit operable to receive first license information proving that the outsource source encryption device has permission from the content distribution device to use the content;

a generating unit operable to (i) generate certification information based on the first license information using a secret key used in public key encryption in the outsource source encryption device, the certification information being digital signature data generated using the public key encryption, and (ii) generate second license information that proves that encryption of the content has been outsourced to the outsource destination encryption device, the second license information including the first license information and the certification information; and a transmission unit operable to transmit the generated second license information together with the received content to the outsource destination encryption device.

8. An outsource encryption device that has permission to encrypt content received from a content distribution device, and outsources encryption of the received content to an outsource destination encryption device, the outsource source encryption device comprising:

a receiving unit operable to receive first license information proving that the outsource source encryption device has permission from the content distribution device to use the content, the first license information including certification information generated using individual information particular to the content distribution device;

a generating unit operable to generate second license information that includes the received first license information and proves that encryption of the content has been outsourced to the outsource destination encryption device;

a transmission unit operable to transmit the generated second license information together with the received content to the outsource destination encryption device.

9. The outsource source encryption device of claim 8, wherein the certification information is generated based on identity information of the outsource source encryption device.

10. The outsource source encryption device of claim 9, wherein the certification information is a certifier generated using secret key encryption, and the individual information is a secret key used in the secret key encryption.

11. The outsource source encryption device of claim 9, wherein the certification information is digital signature data generated using public key encryption, and the individual information is a secret key of the public key encryption.

* * * * *